(12) United States Patent
Martinez

(10) Patent No.: US 11,521,029 B1
(45) Date of Patent: Dec. 6, 2022

(54) DOSING INK FOR DIGITAL PRINTING ON REFLECTIVE SUBSTRATES

(71) Applicant: ColorPortal Europe S.A., Luxembourg (LU)

(72) Inventor: Gerardo Andres Cerros Martinez, Luxembourg (LU)

(73) Assignee: ColorPortal Europe S.A., Luxembourg (LU)

( * ) Notice: Subject to any disclaimer, the term of this patent is extended or adjusted under 35 U.S.C. 154(b) by 0 days.

(21) Appl. No.: 17/553,152

(22) Filed: Dec. 16, 2021

(51) Int. Cl.
| | |
|---|---|
| *G06K 15/02* | (2006.01) |
| *B41J 2/21* | (2006.01) |
| *G01N 21/31* | (2006.01) |
| *G06K 15/00* | (2006.01) |

(52) U.S. Cl.
CPC .......... *G06K 15/021* (2013.01); *B41J 2/2103* (2013.01); *G01N 21/31* (2013.01); *G06K 15/027* (2013.01); *G06K 15/1823* (2013.01); *G06K 15/407* (2013.01)

(58) Field of Classification Search
CPC ............... G06K 15/021; G06K 15/027; G06K 15/1823; G06K 15/407; B41J 2/2103; G01N 21/31
See application file for complete search history.

(56) References Cited

U.S. PATENT DOCUMENTS

2010/0067056 A1* 3/2010 Rich ................ H04N 1/54
358/1.15

FOREIGN PATENT DOCUMENTS

| WO | 2021035105 A1 | 2/2021 | |
|---|---|---|---|
| WO | WO-2021035105 A1 * | 2/2021 | ............. B44D 3/003 |

* cited by examiner

*Primary Examiner* — Quang N Vo
(74) *Attorney, Agent, or Firm* — Dickinson Wright PLLC; Nicholas P. Coleman

(57) ABSTRACT

A computer-implemented method is provided for dosing ink in a digital printing device with multiple ink channels, when printing on a reflective substrate. A digital printing system configured with the method is also provided. Target color data of a target color to be printed on the reflective substrate is captured, including both color data and spectral reflectance data. The captured color data is processed with a printer model to output a preliminary dosing ratio for each ink channel. A digital opacity value for the target color is computed from the dosing ratio of each ink channel. A natural opacity value for the for the target color is computed from the captured spectral reflectance data, and a difference between the digital and natural opacity values is calculated. A predicted dosing ratio for each ink channel is obtained by interpolating the difference against an ink step of a diffuse ink component of the target color.

23 Claims, 11 Drawing Sheets

Fig.4 [prior art]

DOSING INK FOR DIGITAL PRINTING ON REFLECTIVE SUBSTRATES

FIELD OF THE INVENTION

The present invention relates to color data processing techniques within colorimetric spaces for dosing ink in printing devices or systems with multiple ink channels when printing on reflective substrates.

BACKGROUND OF THE INVENTION

Digital printers have been rapidly adopted in the field of professional printing, as their ease of configuration through computer terminals and associated programs has substantially decreased the economical threshold for printed volumes, permitting ever more bespoke, ever smaller production runs.

Digital printers typically include multiple ink channels, e.g. cyan, magenta, yellow and black ('CMYK') or more, e.g. additionally orange, green, violet and red ('CMYKOGVR') are regularly combinations with diffusive inks e.g. white, silver or additional inks such as gloss and primer.

In this context, the task of color matching is traditionally carried out by a digital printing operator as an iterative process, attempting to match a printed result with a target color, bridging device-dependent colorimetric space(s) associated with the printer with conversions through a reference device-independent colorimetric space, a preferred example of which is the International Commission on Illumination ('CIE') Lightness, green-red and blue-yellow ('L*a*b') color space ('CIELAB').

Color-matching workflows have been improved in the digital printing context by recent methods, for instance as disclosed in EP20178552.4 of the applicant. However, color matching and, in particular, opacity matching remains particularly difficult and burdensome when printing on reflective substrates, referred to the in the industry as reflective, shiny and/or mirrored ('RSM') substrates, irrespective of the printer type and whether the printing is directly onto the substrate, or indirectly onto a film applied thereto. If ever achieved, the amount of time and effort to a best match is significant.

A fundamental difficulty arises from the specular reflectiveness exhibited by highly-reflective surfaces like metal, wherein light scattering is significant, relative to the diffuse reflection of more traditional printing substrates such as white coated surface, paper or cardboard.

Angular light scattering of colors printed on reflective substrates also depends upon the size and shape of color pigments from the formulated ink. Pigments of conventional ink typically used in the analog printing of reflective substrate (e.g. aluminum cans, metal sheets) are more polydisperse and can exhibit a larger diameter than inkjet pigments used in digital printers, representing significantly more volume in an ink particle. The resulting mix of reflectivity and scattering exhibited in a print layer can then cause some involuntary selectivity in the orientation of the reflections. Thus, a printed product on a reflective substrate (e.g. flat surface or a cylindrical object) produced with conventional ink pigments frequently exhibits dull reflections that causes increased scattering, which translates as a loss of image density, clarity and sharpness. On the contrary, a product digitally printed with toner or smaller inkjet pigments, typically with UV or Latex inks applied directly on the reflective substrate or onto a film with a functional inkjet coating layer printed with water-based or eco-solvent inks which can be wrapped or laminated onto the substrate exhibits more vivid reflections, sharpness and color clarity resulting in a different color appearance when compared with a conventional printing process.

In certain printing applications, particularly when printing on a white substrate, the ink opacity (or density) is represented by a measurement which defines the amount of light passing through the ink coating applied onto the printed surface. The measure is typically made with either a reflective or a transmission densitometer. However, if other measurable methodologies are disclosed to define the opacity of a given colored ink on a white substrate, these methodologies will not deliver satisfactory results since the RSM substrate reflectance is a key component challenging existing methods. It is believed that no method exists to quantify opacity or transparency of a color on RSM substrates. Currently, metal decorating ink manufacturers determine the opacities of their inks at their own appreciation, usually based on the pigment selection to formulate a colored ink with or without a diffusive element such as white ink.

As printing artworks and effects become ever more complex, accordingly the variety of inks specially adapted for use in decoration applications represent a further difficulty in color and opacity matching for printing on reflective substrates. Manufacturers formulating inks for reflective substrates have introduced inks with discrete levels of opacity, semi-normalized as opaque, semi-opaque and transparent inks, wherein opaque inks block most of the reflectiveness of the underlying substrate, transparent inks allow the reflectiveness of the underlying substrate to pass substantially through the color, and semi-opaque inks provide an intermediate level of opacity.

Specialist domain knowledge highlights further factors of complexity when color matching for reflective substrate printing. For example, when printing with a wet-on-wet screen process, inks must be matched as semi-opaque variants, wherein lighter and warmer colors, such as yellow, orange and red, should be matched with slightly more opacity. By contrast, colors known as pastel colors, which are characterized by a high lightness and low saturation, should only be matched as opaque variants in order to obtain the best and cleanest hue.

Colors on a diffuse white surface are usually measured with a spectrophotometer under 45/0° or 0/45° geometry, and colors on reflective surfaces are measured with a multi-angle or spherical spectrophotometer under d/8° geometry, wherein the spherical spectrophotometer captures specular reflection in a measurement that either includes the specular component ('SPIN') or excludes it ('SPEX'). For example, a SPIN measurement captures without variation the total reflectance regardless of the surface type (matte, gloss or other) and is said to represent the "true color", so a target SPIN value should be matched for the printed color to exhibit satisfactory color representation. A SPEX measurement usually excludes the gloss component when capturing the reflectance variation based on differing surfaces, and is said to represent the "sample appearance", so a SPEX value should be matched for the printed color to exhibit satisfactory color consistency. Measuring a color in SPIN or SPEX delivers distinct and respective values for the color, wherein a difference between the spectral reflectance and with its respective converted L*a*b values for the color vary based on the degree of specular reflectance of the substrate, and wherein the non-linearity of the measurement difference in the spectrum range, can further vary differences in the L*a*b values.

In a traditional design process to define the final printed product, colors can be selected from a given printed reference or from printed color books such as a Pantone® guide. However, the color selection may or may not be represented in very different surface reflection such as white paper, while the desired printed product is going to be printed on a RSM substrate which consequently mislead the choice of colors due to a very different perception when compared with the final printed product on a RSM substrate.

Among various proofing technologies (digital or analog) attempting to replicate the final printed product, some have been developed as digital imaging systems with adjustable color densities (e.g. Fuji FinalProof® or Kodak® Approval®), using advanced laser imaging technology to combine imaging passes of specific digital donors, and transferring film layers onto the production substrate.

Improvements have also been presented to optimize the decision making of colors selection in the design process. For example, PantoneLIVE® provides digital color information from colors available in the Pantone® guides that have been pre-processed onto a variety of printed substrates, including reflective substrates such as metal or aluminum. However, this digital data available from PantoneLIVE® libraries defined for metal or aluminum do not provide sufficient information to reproduce, with an external conventional or digital system, accurately and simultaneously color with its notion of opacity mainly because opacity in such surface is defined arbitrary by a selective group of people from Pantone® or its preferred ink manufacturer partner Sun Chemical which are not disclosing the information or a given methodology to match color and opacity.

In another recent example, physical color catalogs have been introduced where the conventional ink has been applied directly to a reflective surface such as aluminum. For instance, the INX Color Perfection® Catalog for 2-Piece metal decoration with a range of more than 600 colors claims to be the only color catalog available on metal, not paper. However, this analog process of applying the ink on the production substrate requires a tremendous effort and it is difficult to maintain under tight color deviations once comparing different versions of the catalog. The color samples are available as physical color reference and the digital data available do not provide sufficient information to replicate accurately these colors, inclusive of opacity, with a conventional or a digital system such as flat, roll-to-roll, high-speed or cylindrical printing devices.

In the above context, color and opacity matching workflows for printing on reflective substrates still correspond broadly to traditional workflows disclosed as prior art in EP20178552.4, wherein operators initialize ink values, print samples, check color accuracy and modify ink values towards matching as required. WO2021/035105 of Sun Chemical Corporation discloses an example of such prior art techniques in the specific field of reflective substrate printing.

Any color matching workflow begins with an operator obtaining a table of spot colors or target colors to reproduce with a specific printer. Each printer has its own printer calibration, which relies on the device's ink channels, printing head characteristics and printing substrate with a distinct color profile (e.g. International Color Consortium 'ICC' profiles) that contains information to convert a color from the $L^*a^*b$ color space, or another, to the device color space, wherein $L^*a^*b$ (or other) values obtained for each color in the table are input to a raster image processor ('RIP') computer program. The RIP program processes the target $L^*a^*b$ values with the printer's color profile and computes output values for each ink as a color-respective ink dosage, known as an inks separation. For example, with a target color of $L^*a^*b$ values [14.191, 18.511, 4.177], a RIP program may propose that the respective ink dosage values for a CMYKOG printer should be [50.196, 100, 100, 50.196, 50.196, 0].

As the device color space of a printer is defined by inks which it uses, then in the context of reflective substrate printing, this includes opaque, semi-opaque and transparent variants. Subject to the artwork characteristics, a major difficulty occurs with artworks which require printing digitally within a same workflow, in which target colors with discrete levels of opacity need to be matched. An operator faces the further difficulty that matching colors in both SPIN and SPEX requires the use of respective color profiles, wherein each printer profile will calculate a distinct and respective inks separation, each different from the other.

An improved method of dosing inks in multichannel printers when printing artworks on reflective substrates is therefore desirable, apt to provide inks separations that are a closer match to target colors inclusive of opacity and with reduced user input requirements, relative to techniques of the prior art.

SUMMARY OF THE INVENTION

The present invention provides a method of dosing ink in multi-channel printers, which automates substantially the adjustment workflow inherent to the task of color matching actual and target colorimetric values when printing on a reflective substrate, wherein the opacity of a target color to be printed digitally or conventionally on the reflective substrate is determined.

According to an aspect of the present invention, there is provided a computer-implemented method for dosing ink in a printing device with multiple ink channels when printing on a reflective substrate, comprising the steps of capturing target color data of at least one target color to be printed on the reflective substrate, wherein the target color data comprises both color data and spectral reflectance data inclusive of specular component included and specular component excluded; generating a printer model; processing the captured color data with the printer model to output a preliminary dosing ratio for each ink channel, representative of a respective color component of the target color; computing a curve from each ratio and interpolating same to output a digital opacity value for the respective ink channel; combining respective digital opacity values of all ink channels to output a digital opacity value for the at least one target color; computing a natural opacity value from the captured spectral reflectance data; calculating a difference between the computed digital opacity value and the computed natural opacity value; and interpolating the calculated difference against an ink step of a diffuse ink component of the at least one target color to obtain a predicted dosing ratio for each ink channel.

An embodiment of the method may comprise the further step of calibrating the printer with both specular component on a reflective surface and specular component on the reflective surface with a diffuse ink layer.

In an embodiment of the method, the step of generating a printer model may comprise the further step of generating a printer calibration model based on specular component on a reflective surface and specular component on the reflective surface with a diffuse ink layer.

An embodiment of the method may comprise the further step of classifying the or each target color according to the defined target opacity; and repeating the step of processing with substituting the captured color data for data representative of the or each classified color; wherein the obtained predicted dosing ratio for each ink channel includes a dosing ratio for a diffuse ink, such as white ink.

An embodiment of the method may comprise the further steps of adding the predicted ratio of the diffuse ink from the target natural opacity value to output a next digital opacity value; and calculating a difference between the natural opacity value and the next digital opacity value; wherein the calculated difference is a value referred to as delta opacity for the reflective substrate.

A variant of any of the preceding embodiments may comprise the further step of correcting the calculated difference before the step of interpolation, wherein the correcting comprises setting the difference to zero, either when the natural opacity value is below a predefined threshold value, or when the calculated difference value is negative. A variant of this further embodiment may comprise the further step of correcting the predicted dosing ratio for each ink channel with a composite function saved as a look-up table.

A variant of any of the preceding embodiments may comprise the further steps of generating a color chart from the predicted dosing ratio for each ink channel; or generating a color chart from the corrected dosing ratio for each ink channel; and printing the color chart with the printer on a reflective substrate. The substrate may be an object directly printed by a cylindrical printer, or a flat surface, or an optical clear or transparent layer for placing onto the intended reflective substrate.

A variant of any of the preceding embodiments may comprise the further steps of determining the opacity of a formulated conventional ink where the colorant or base inks are characterized in order to specify the opacity at each ink step with the aim to match specific opacities of the final conventional ink formula.

An embodiment of the method may comprise the further step of computing a diffuse ink percentage from a digital opacity value of the target color to obtain respective versions of digital opacities ranging from transparent to opaque by keeping the chroma and hue (independently from its opacity level) of the target color. A variant may comprise the further step of predefining threshold values which predict opacities for the pastel colors that are generally match to an higher opacity.

An embodiment of the method may comprise the further step of outputting predicted dosing ratio for each ink channel respectively for a lighter version and a darker version of the target color at a given a distance in the L*a*b color space, for example a Delta-E measure.

An embodiment of the method may comprise the further step of generating a digital ink drawdown or color card representative of a digital color and opacity match for a target color deemed to be best, optionally with lighter and darker versions specified at a predetermined distance Delta-E in the L*a*b color space.

According to a further aspect of the present invention, there is also provided a digital printing system comprising a digital printer with multiple ink channels, means for capturing target color data of at least one target color to be printed on a reflective substrate with the printer, and a data processing terminal internal to or operably interfaced with the digital printer, configured by a set of instructions to receive the captured target color data, wherein same comprises both color data and spectral reflectance data inclusive of specular component included and specular component excluded; generate a printer model; process the captured color data with the printer model to output a preliminary dosing ratio for each ink channel, representative of a respective color component of the target color; compute a curve from each ratio and interpolating same to output a digital opacity value for the respective ink channel; combine respective digital opacity values of all ink channels to output a digital opacity value for the at least one target color; compute a natural opacity value from the captured spectral reflectance data; calculate a difference between the computed digital opacity value and the computed natural opacity value; and interpolate the calculated difference against an ink step of a diffuse ink component of the at least one target color to obtain a predicted dosing ratio for each ink channel.

An embodiment of the system may further comprise a network to which the data processing terminal and a remote terminal are operably interfaced, and wherein the captured target color data is received from the remote terminal. Irrespective of the network connectivity, the means for capturing is preferably a spherical or multi-angle spectrophotometer.

The reflective substrate may be selected from the group comprising reflective, shiny and/or mirrored ('RSM') substrates, including metal such as aluminum, plastic such as film, foil and vinyl, and glass.

In a networked embodiment, the system may further comprise data bridging means interfacing the data processing terminal and/or the spectrophotometer with remote storage means, for example a cloud-based data storage node, wherein the color data is optionally encrypted prior to uploading to the remote storage means.

In a networked embodiment, captured target color data may be uploaded from the data processing terminal to, stored in a database at, and processed by a cloud-based data processing node operably configured to translate stored color data according to a color data request of a remote data processing terminal.

According to another aspect, a method of observing a target color matched and applied to a reflective substrate according to the invention is provided in a light booth, wherein viewing angles are related to the opacity level of a given color.

According to another aspect of the present invention, there is also provided a set of instructions recorded on a data carrying medium or stored at a network storage medium which, when read and processed by a data processing terminal, configures that terminal to perform the steps of any of the embodiments of the method described herein.

Other aspects are as set out in the claims herein.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF THE EMBODIMENTS

There will now be described by way of example a specific mode contemplated by the inventor. In the following description numerous specific details are set forth in order to provide a thorough understanding. It will be apparent however, to one skilled in the art, that the present invention may be practiced without limitation to these specific details. In other instances, well known methods and structures have not been described in detail so as not to unnecessarily obscure the description.

Figure 1:
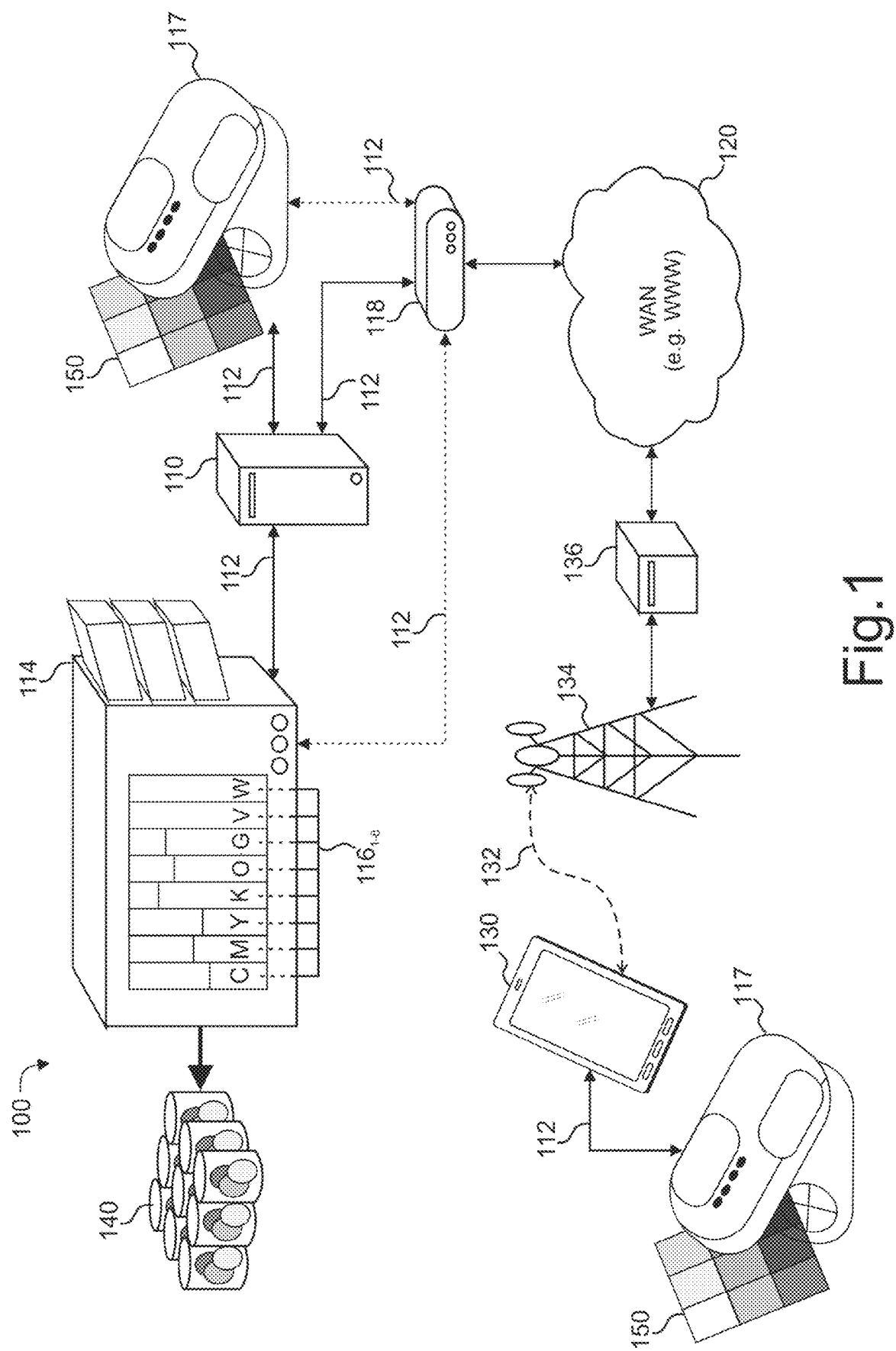
FIG. 1 is a logical diagram of a digital printing system in a networked environment, configurable according to the invention, including a local data processing terminal interfaced with a digital multichannel color printer, a remote data processing terminal, and a table of spot colors.
Figure 2:
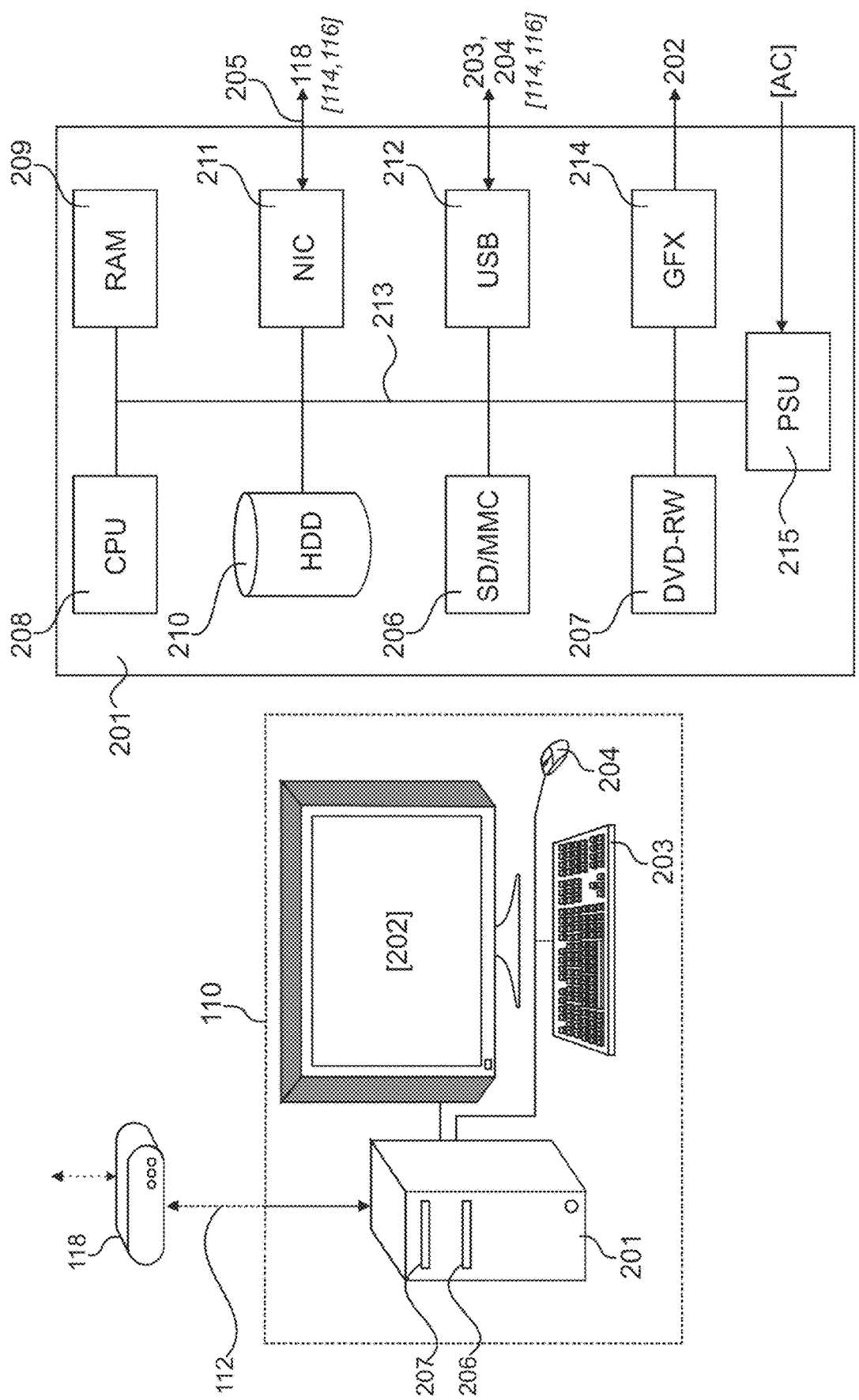
FIG. 2 is a hardware diagram of a typical hardware architecture of a data processing terminal shown in FIG. 1, including a processor and memory means storing a set of data processing instructions.

Referring now to the Figures and initially FIGS. 1 and 2, an example of a digital printing system 100 is shown, which is configurable with embodiments of the data processing method of the invention. The digital printing system 100 includes a data processing terminal 110 locally interfaced, through one or more high-bandwidth data connections 112, with a digital multichannel color printer 114, in the example an inkjet printer with eight color channels $116_{1-8}$ comprising cyan (c), magenta (m), yellow (y), black (k), orange (o), green (g), violet (v), and white (w) as a diffuse ink ('OMYKOGV+W'), and a spectrophotometer 117.

The digital printing system 100 is located within a networked environment, wherein the data processing terminal 110 is a personal computer device which uploads and downloads data encoded as digital signals over high-bandwidth wired or wireless data connections 112, wherein such signals are relayed respectively to or from the computer 110 by a local router device 118 implementing a wired local network operating according to the IEEE 802.3-2008 Gigabit Ethernet transmission protocol and/or a high-bandwidth wireless local network operating according to the IEEE 802.11 Wi-Fi wireless transmission protocol.

A typical hardware architecture of the data processing terminal 110, a desktop computer, is shown in FIG. 2 in further detail, by way of non-limitative example. The computer is configured with a data processing unit 201, data outputting means such as video display unit (VDU) 202, data inputting means such as HID devices, commonly a keyboard 203 and a pointing device (mouse) 204, as well as the VDU 202 itself if it is a touch screen display, and data inputting/outputting means such as the wired or wireless network connection 112 to local and wide area networks via the router 118, a magnetic data-carrying medium reader/writer 206 and an optical data-carrying medium reader/writer 207.

Within the data processing unit 201, a central processing unit (CPU) 208 provides task co-ordination and data processing functionality. Sets of instructions and data for the CPU 208 are stored in memory means 209 and a hard disk storage unit 210 facilitates non-volatile storage of the instructions and the data. A wireless network interface card (NIC) 211 provides the interface to the network connection 112 with the router 118. One or more universal serial bus (USB) input/output interfaces 212 facilitate connection to the keyboard and pointing devices 203, 204. Subject to the presence or absence of network connectivity features in the printer 114 and the spectrophotometer 117, data communications between the computer 110, the printer 114 and the spectrophotometer 117 may be routed through the router device 118, or through wired connections to the computer's USB interfaces 212, or a combination thereof.

All of the above components are connected to a data input/output bus 213, to which the magnetic data-carrying medium reader/writer 206 and optical data-carrying medium reader/writer 207 are also connected. A video adapter 214 receives CPU instructions over the bus 213 for outputting processed video data to VDU 202. All the components of data processing unit 201 are powered by a power supply unit 215, which receives electrical power from a local mains power source and transforms same according to component ratings and requirements.

The router 118 is itself connected to a wide area network, an example of which is the Internet 120, via a conventional ADSL or optical fiber connection and through which digital data may be uploaded to and downloaded from remote data processing terminals. Network connectivity and interoperable networking protocols of each data processing terminal allow the terminals to connect to one another and communicate data to and receive data from one another according to certain embodiments the methodology described herein.

Remote data processing terminals may be desktop computers as described with reference to FIG. 2, or portable variants like laptop and tablet computers. Remote data processing terminals may also include personal communication devices 130, e.g. smartphones, which broadcast and receive data, including voice and/or alphanumerical data, encoded as a digital signal over a wireless data transmission 132, wherein the signal is relayed respectively to or from each device 130 by the geographically-closest communication link relay 134 of a plurality thereof. The plurality of communication link relays $134_{1-N}$ allows digital signals to be routed between mobile devices $130_{1-N}$ and their counterpart by means of a remote gateway 136. Gateway 136 is for instance a communication network switch, which couples digital signal traffic between wireless telecommunication networks, such as the network within which wireless data transmissions 132 take place, and the WAN 120.

The digital printing system 100 outputs printed products 140 having a reflective substrate, a well-known example of which is drinks cans made of aluminum, wherein the accuracy of color reproduction by the printer 114 in output printed products 140 is paramount. Accordingly a table 150 of spot or target colors is provided to help calibrate color reproduction by the printer 114 with the data processing terminal 110, through the process known in the art as color matching.

Figure 3:
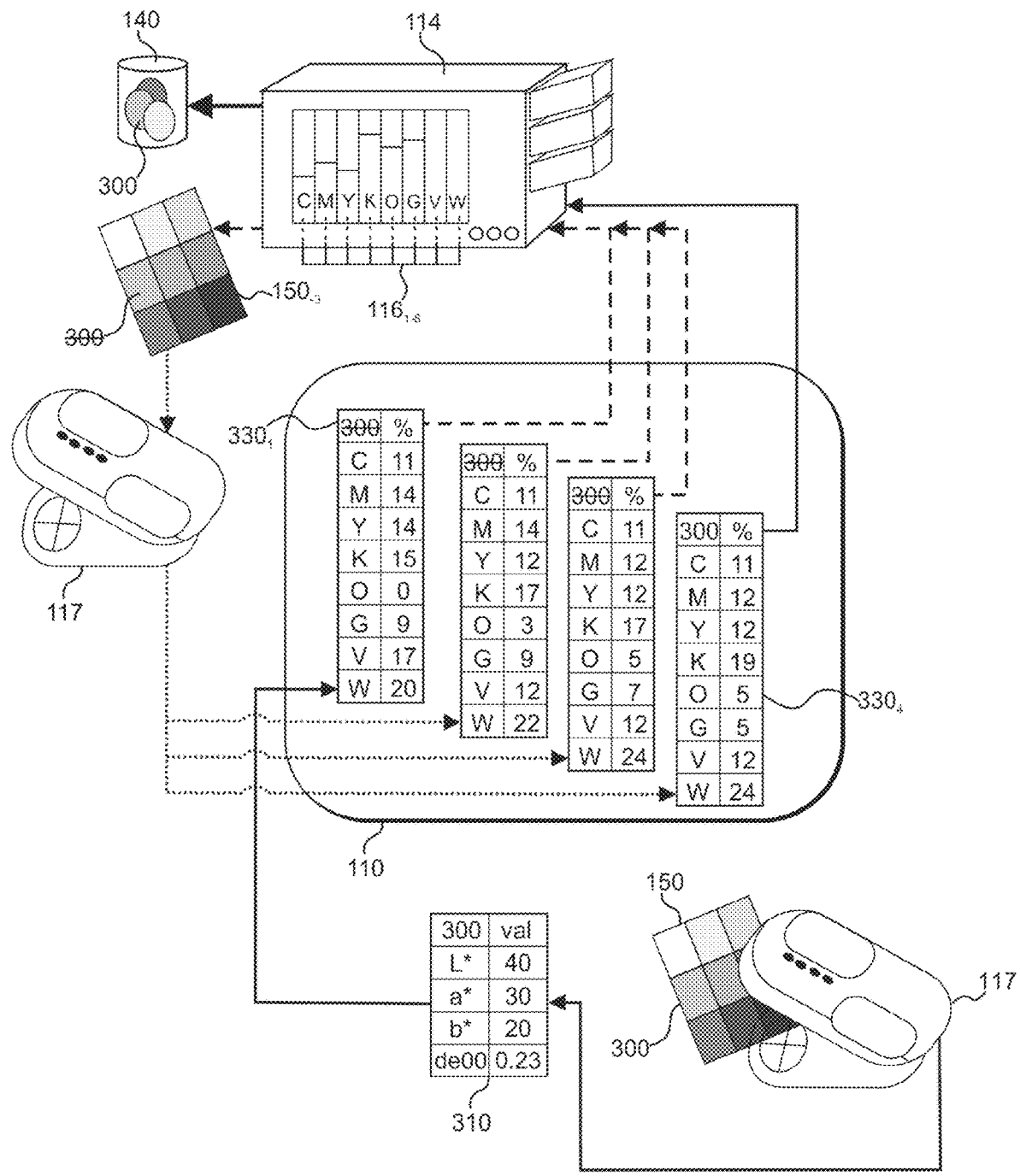
FIG. 3 is a logical diagram illustrating the matching of a target color for printing same on a reflective substrate with the digital printing system of FIGS. 1 and 2.
Figure 4:
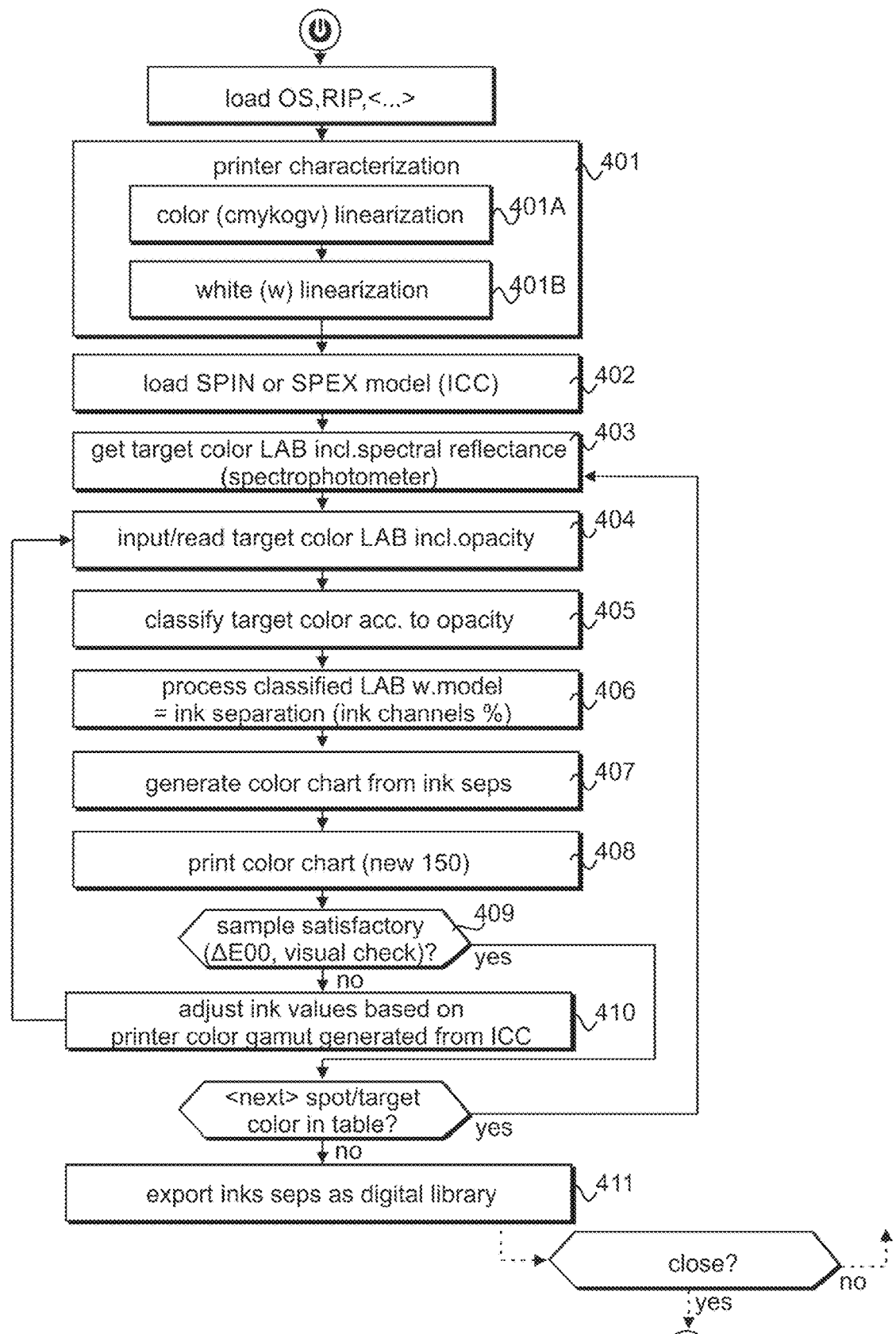
FIG. 4 is a flowchart representation of a prior art method for matching target colors as illustrated in FIG. 3.

With reference to FIGS. 3 and 4, color matching on reflective substrates with the system 100 has typically been performed as an iterative trial-and-error process. Further to switching the computer 110 on and loading its operating system then a raster image processor (RIP) application, the prior art method is initiated by characterizing the printer 114 of the digital printing system 100 at step 401, wherein color and white undergo respective linearization at steps 401A, 401B.

At step 402, a forward printer model is defined at the operator terminal 110 based on specular component, which may consist of the forward transformation function defined by the printer's ICC profile.

At step 403, at least a first target color 300 is defined in a color library, for example the table 150 of spot or target colors for an artwork printing job, which requires matching in the digital printing system for color accuracy and color opacity, i.e. representative of the targeted printed color 300. The capturing of target color data is accomplished by measuring the L*a*b values 310 of the target color in the table 150 with the spectrophotometer 117, including in SPIN or SPEX, and saving the measurements as respective sets of values at the terminal 110.

Each target color 300 is made up of several colors, each corresponding to an ink respectively available from an ink channel $116_{1-8}$ of the printer 114. For each target color, the conventional printer model provides a set of ink channel-respective dosing ratios 330, for instance expressed as a percentage for each ink relative to the combination of all inks for the target color, which is known in the art as color separation data.

Color accuracy and opacity matching steps are followed, wherein the forward printer model is started and the captured and saved target color 310, or full library thereof, is read at step 404, the or each target color is classified based on its measured opacity at step 405, and the classified color(s) is/are processed with a color prediction algorithm to output respective ink separation(s) 330 at step 406, for instance with the ink dosage techniques taught in EP20178552.4.

A color chart is generated with the output ink separation(s) at step 407, wherein color separations 330 are inclusive of opacity, then processed by the forward printer model and printed as a color chart 150 with the printer 114 at step 408.

The printed color chart is then measured with the spectrophotometer 117, including in SPIN or SPEX, at step 409 and, subject to the scale of the difference observed relative to the values previously measured for the target color at step 403, the color values of step 406 are typically corrected at step 410. Such a correction may be applied with a correction algorithm for the ink color separation according to tolerance definition, for instance with the ink dosage correcting techniques taught in EP20178552.4.

Iterations of the color accuracy and opacity matching steps 404 to 410 continue, until such time as required values for the target color 300 are matched within acceptable tolerances, or the color gamut limit of the printer is reached for the solution. In the example shown in FIG. 3, the first set of color separations $330_1$ output at step 407 and printed as a color chart $150_{-3}$, once measured at step 409, does not correspond sufficiently closely to the target color 300, a situation illustrated with the reference numeral in struck out font. In the example, the color values are corrected thrice, wherein the fourth set of color separations $330_4$ output at step 407 and printed as a color chart 150, once measured at step 409, is deemed to correspond sufficiently closely to the target color 300.

The iteration of the printed color chart deemed to best match the target color(s) is then exported as a digital library of ink color separations 330 at step 411. The exported digital library may then be used in the digital printing system 100 with a RIP application to print the artwork with the matched colors.

Through experience, the inventor has determined that the non-trivial number of iterations of the color accuracy and opacity matching steps 404 to 411 with prior art techniques is caused by the scale of the difference between the target color characteristics to match and the initial set of ink separation(s) $330_1$ output at step 407. Through domain knowledge and experimentation, the inventor has realised that diffuse ink components of a color, for example white, silver, gloss, a primer or another (wherein white (w) is used throughout the present description to avoid unnecessary complexity, but may be substited for any other diffuse ink), can be used to compensate the difference between the natural opacity and the digital opacity of a target color 300, for ouputting a more accurate initial set of ink separation(s) $330_1$, i.e. corresponding more closely to the separations required to match the target color 300 and its opacity relative to the prior art.

The inventor has devised a technique which defines the opacity of a target color when printed conventionally or digitally on a reflective substrate, based on a measurement with a spherical or multi-angle spectrophotometer 117, wherein the spectral reflectance with the specular inclusion and the specular exclusion (or a combination of different measuring angles) define a target opacity value, for example by subtracting a value representative of the specular component excluded of the target given color data from a value representative of the specular component included of the target given color data. The technique provides a way of matching the natural opacity of a target color to its associated digital opacity via the addition of a predetermined number of diffuse inks, for example white, silver, gloss, a primer, or another.

Figure 5:
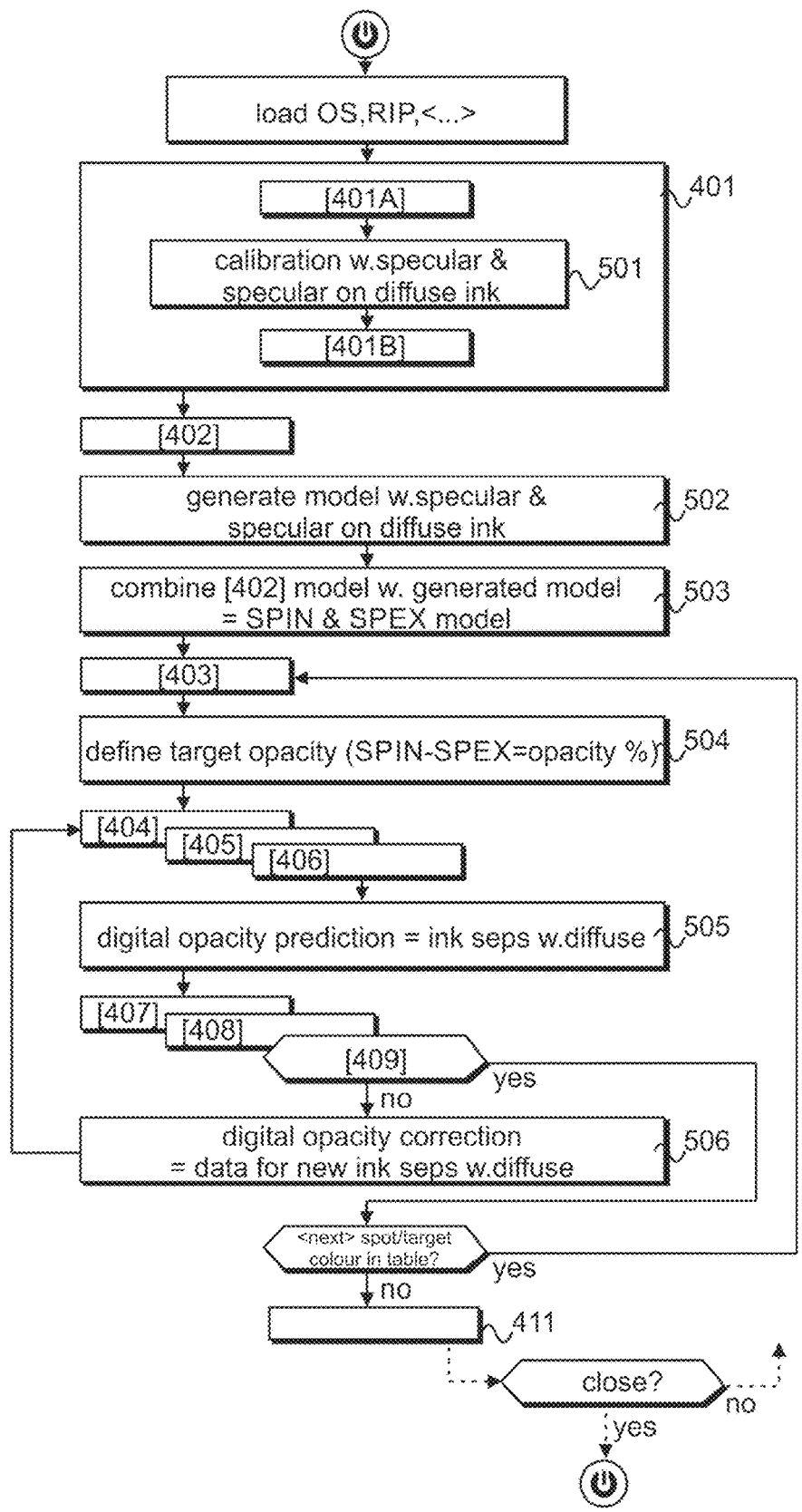
FIG. 5 is a flowchart representation of a general method of dosing inks according to the invention, useable to improve the target color-matching method of FIGS. 3 and 4, including a step of predicting ink separations including a diffusive ink and a step of correcting the predicted ink separations.

With reference to FIG. 5 now, a color matching process performed by the system 100 with an embodiment of the method of dosing ink according to the invention is now described, wherein like references designate like steps relative to FIG. 3.

Further to switching the computer 110 on, loading its operating system and a set of instructions embodying relevant data processing aspects of the color matching method, the printer 114 is initially characterized again at step 401. Color undergoes linearization at step 401A and, in the method of the invention, the printer undergoes calibration with both specular component and specular on a diffuse ink layer applied to the substrate at step 501, in the example white ink, before the diffuse ink undergoes linearization at step 401B.

At step 402, a forward printer model is again defined at the operator terminal 110 based on specular components. At step 502, a further forward printer model is also defined based on specular component on the diffuse white layer applied to the substrate, and the two forward printer models are combined at step 503, resulting in a single forward model combining the SPIN and SPEX spectral reflectance of each color.

At step 403, at least a first target color is defined in a color library, for example the table 150 of spot or target colors, which requires matching in the digital printing system for color accuracy and color opacity. The capturing of target color data is again accomplished by measuring the target color 150 with the spectrophotometer 117, including in SPIN and SPEX, and inputting the measurements as respective sets of values at the terminal 110. The target opacity is also defined at step 504, wherein the SPEX value is effectively subtracted from the SPIN value to define the degree of opacity therebetween, as a percentage.

Color accuracy and opacity matching steps are then followed, wherein the forward printer model is started and the saved target color, or full library thereof, is read at step 404, and the or each target color is classified at step 405 according to the degree of opacity of step 504.

The classified color(s) is/are processed with a color prediction algorithm to output respective ink separation(s) at step 406, for instance with the ink dosage techniques taught in EP20178552.4. At step 505, further described with reference to FIG. 8, the or each classified color is further processed with an opacity prediction algorithm, to output respective ink separation(s) including a diffuse ink. The opacity prediction algorithm relies upon the natural opacity and the digital opacity values of a target color. The opacity of each target color is calculated using interpolation on the respective digital opacity curve of each component ink in the separation(s) of step 406, then adding up the digital opacities of all component inks. The natural opacity of each target color is computed from the SPIN/SPEX spectral reflectance data obtained at step 403. The opacity prediction algorithm computes the difference between the natural opacity value and the digital opacity value for the target color and interpolates it against the diffuse ink-step, to output a prediction for the diffuse ink (e.g. white) ratio, conferring the target color its target opacity when printed.

A color chart is then generated with the output ink separation(s) at step 407, which combines the color separation prediction of step 406 and the color opacity prediction of step 505. The generated color chart is processed by the forward printer model and printed with the printer 114 at step 408 on a test substrate, which may be the reflective substrate of the intended application or, alternatively, an optical clear or transparent substrate which can be superimposed onto the reflective substrate of the intended application.

The printed color chart is then measured with the spectrophotometer 117, including in SPIN and SPEX, at step 410 and color values are optionally corrected, subject to the difference observed relative to the sets of values saved for the target color. In this method, color values are further corrected at step 506, subject the difference observed relative to the sets of values saved for the target opacity, with an opacity correction algorithm further described with reference to FIG. 9. In an embodiment of the method described hereinafter, the opacity correction algorithm relies upon a plurality of interpolations of the curves computed by the opacity prediction algorithm.

Iterations of the color accuracy and opacity matching steps 404 to 506 continue, until such time as required target color values are matched within acceptable tolerances, or the color gamut limit of the printer is reached for the solution.

The iteration of the printed color chart deemed to best match the target color(s) is then exported as a digital library of ink color separations with diffuse ink at step 411, wherein the exported digital library generated with the method of the invention may then be used in the digital printing system 100 with a RIP application to print the artwork onto the reflective subtrate with the matched colors.

Color data computing techniques now follow, for implementing steps 501 to 506 of the method according to the invention as data processing instructions, wherein the following notation is used consistently throughout for ease of comprehension: inks in the printer 114 of the example include cyan (c), magenta (m), yellow (y), black (k), orange (o), green (g), violet (v) and white (w), and the color inks 'c-m-y-k-o-g-V' are collectively denoted by $\mu$; the ink-step is denoted by $\alpha$, varying from 0 to 1; the color wavelength is denoted by $\lambda$, expressing a value in nanometers (nm) in the range for example from 400 ($\lambda_{min}$) to 700 ($\lambda_{max}$)

The spectral reflectance of a target color $\mu$ under specular inclusion SPIN and specular exclusion SPEX can be represented respectively as:

$$\phi_{\alpha\lambda}^{\mu}, \{(\alpha=0, \ldots, 1),(\lambda=\lambda_{min}, \ldots, \lambda_{max})\}$$

$$\psi_{\alpha\lambda}^{\mu}, \{(\alpha=0, \ldots, 1),(\lambda=\lambda_{min}, \ldots, \lambda_{max})\}$$

There are, for example, 40 linear or non-linearly-spaced ink-steps in the range 0 to 1 and, with an increment of 10 nm, 31 linearly-spaced wavelengths in the range 400 to 700 nm. This gives a total of $n_\mu$, 2-D arrays $\phi_{\alpha\lambda}^{\mu}$ and $\psi_{\alpha\lambda}^{\mu}$ of size $n_\alpha \times n_\lambda$ for each of the $n_\mu$, colors in $\mu$.

The natural opacity of a target color is computed from its SPIN/SPEX spectral reflectance data, wherein the areas under the SPIN and SPEX curves for the color inks are respectively given by:

$$\Phi_\alpha^\mu = \int_{\lambda_{min}}^{\lambda_{max}} \phi_{\alpha\lambda}^\mu$$

$$\Psi_\alpha^\mu = \int_{\lambda_{min}}^{\lambda_{max}} \psi_{\alpha\lambda}^\mu$$

The natural opacities of the color inks from cyan to violet, are given by:

$$\omega_\alpha^\mu = \frac{\Psi_\alpha^\mu}{\Phi_\alpha^\mu}$$

The areas are calculated numerically by the mid-point rule and the element by element division using Hadamard product, but alternative embodiments consider the use of Simpson's $\frac{1}{3}^{rd}$, $\frac{3}{8}^{th}$ rule for enhanced accuracy.

The digital opacity of a target color is computed using interpolation on the respective digital opacity curve of each component ink based on its respective ratio in the target color, then adding up the digital opacities of all component inks. The digital opacities of the color inks from cyan to violet, are given by:

$$\Omega_\alpha^\mu = \omega_\alpha^\mu - \omega_0^{avg}$$

wherein $\omega_0^{avg}$ is the substrate opacity, calculated as the average of the opacities at 0% ink-step of all colors excluding the diffuse ink, e.g. white:

$$\omega_0^{avg} = \frac{\sum_\mu \omega_0^\mu}{n_\mu}$$

The ink opacities are curve-fitted. A composite curve is constructed from a weighted average of $5^{th}$ and $6^h$ order polynomials, Fourier series and sum-of-sines curve fits, wherein each component can be assigned a respective weight. The curve fit equations are a polynomial curve fit ($5^{th}$ degree) $y_1$, a polynomial curve fit ($6^{th}$ degree) $y_2$, a sum-of-sines curve fit (3 term) $y_3$ and a Fourier series surve fit (3 term) $y_4$, wherein the composite curve constructed from the above equations is given by:

$$y = \frac{\sum_{k=1}^{4} y_k w_k}{\sum_{k=1}^{4} w_k} \quad (1)$$

wherein $w_k$, are the weights assigned to the individual curve-fits: each ink has a different impact, wherein the fomula reaches for an average between the inks, whereby the best fit is derived from the weighted average of the four.

The resulting natural opacity curve fit $\gamma^\mu(\alpha)$ constructed as per equation (1) is given as:

$$\gamma^\mu(\alpha) \approx \omega_\alpha^\mu$$

The resulting digital opacity curve fit (a), wherein the maximum function max is applied to avoid negative digital opacities is given as:

$$(2) \Gamma^\mu(\alpha) = \max(\gamma^\mu(\alpha) - \omega_0^{avg}, 0) \approx \Omega_\alpha^\mu$$

A best fit is obtained by subtracting substrate opacities from the natural opacities of each color, wherein a zero opacity is assigned whenever the calculation outputs a negative value.

Considering now the diffuse ink component, the spectral reflectance of the color white 'w' under specular inclusion SPIN and specular exclusion SPEX where the subscripts $\alpha$ and $\lambda$ represent respectively the ink-step (going from 0 to 1) and the wavelength (typically ranging from 400 to 700 nm) can be represented respectively as:

$$\phi_{\alpha\lambda}^w, \{(\alpha=0, \ldots, 1), (\lambda=\lambda_{min}, \ldots, \lambda_{max})\}$$

$$\psi_{\alpha\lambda}^w, \{(\alpha=0, \ldots, 1), (\lambda=\lambda_{min}, \ldots, \lambda_{max})\}$$

There are, for example, 51 linearly or non-linearly-spaced ink-steps in the range 0 to 1 and, with an increment of 10 nm, 31 linearly-spaced wavelengths in the range 400 to 700 nm. This gives the 2-D arrays $\phi_{\alpha\lambda}^w$ and $\psi_{\alpha\lambda}^w$ of size $n_\alpha \times n_\lambda$ for the white color.

To compute the natural opacity of white ink, the areas under the SPIN/SPEX curves for the white ink are given by:

$$\Phi_\alpha^w = \int_{\lambda_{min}}^{\lambda_{max}} \phi_{\alpha\lambda}^w$$

$$\Psi_\alpha^w = \int_{\lambda_{min}}^{\lambda_{max}} \psi_{\alpha\lambda}^w$$

The natural opacities of the diffuse ink, white in the example, are given by the following equation using Hadamard product for the element by element division:

$$\omega_\alpha^w = \frac{\Psi_\alpha^w}{\Phi_\alpha^w}$$

The digital opacity of the diffuse ink is given by subtracting the natural opacity of white ink at 0% ink from the natural opacities, which is equivalent to:

$$\Omega_\alpha^w = \min(\max(\omega_\alpha^w - \omega_0^w, 0), 1)$$

wherein the minimum function min and the maximum function max are applied to avoid opacities percentages less than 0% and greater than 100%.

The functional relationship between the digital opacity $\Omega^w$ and the ink-step $\alpha^w$ is inverted for the diffuse ink: ink steps are fitted to the opacities. The diffuse ink digital opacity curve fit $\Gamma^w(\Omega^w)$ constructed as per equation (1) is given as:

$$(3) \Gamma^w(\Omega^w) \approx \alpha^w$$

The target colors ($t_i$) are made up of several colors from the color inks $\mu$. The printer model provides the ink percentages $\alpha^\mu$ of each color ink $\mu$ this is available from the ink separation data. Based on the ink separation, the digital opacity of each target color can be found out using interpolation on the respective digital opacity curve $\Gamma^\mu(\alpha)$, and then adding up the digital opacities of all component inks. On the other hand, the SPIN/SPEX spectral reflectance data for each target color is also available, from which the target color natural opacities can be computed.

The principle underlying the solution described herein, is to use a diffuse or achromatic ink, e.g. white, silver, a primer or another, to compensate for the difference between the natural and digital opacities of the target color. The difference in the opacities is thus interpolated against the diffuse ink-step, to obtain a first prediction for the diffuse ink, e.g. white in the illustrations herein.

On the above basis, the prediction of the diffuse ink component ratio is computed as follows. Assume there are N target colors. That is i=1,2, . . . , N. For each target color $t_i$, we have the SPIN and SPEX spectral reflectances $\phi_\lambda^i$ and $\psi_\lambda^i$:

$$\phi_\lambda^i, \{(i=0, \ldots, N), (\lambda=\lambda_{min}, \ldots, \lambda_{max})\}$$

$$\psi_\lambda^i, \{(i=0, \ldots, N), (\lambda=\lambda_{min}, \ldots, \lambda_{max})\}$$

wherein the arrays $\phi_\lambda^i$ and $\psi_\lambda^i$ are $N \times n_\lambda$ each.

For each target color $t_i$, there is a color separation calculated from the printer model, denoted as:

$$\alpha_\mu^i, \{(i=1, \ldots, N)\}$$

whereby, for N target colors, this gives the array $\alpha_\mu^i$ of size $N \times n_\mu$.

The areas under the target SPIN/SPEX curves are:

$$\Phi^i = \int_{\lambda_{min}}^{\lambda_{max}} \phi_\lambda^i$$

$$\Psi^i = \int_{\lambda_{min}}^{\lambda_{max}} \psi_\lambda^i$$

The target color natural opacities are given by:

$$\omega^i = \frac{\Psi^i}{\Phi^i} \quad (4)$$

The target color digital opacities are obtained from the curve-fits in equation (2) as:

$$(5) \Omega^i = \tau_\mu \Gamma^\mu(\alpha_\mu^i)$$

The difference $\delta^i$ between the target color's natural and digital opacity is compensated using white ink percentage $\alpha_w^i$ as below:

$$\delta^i = \omega^i - \Omega^i$$

In an embodiment, a preliminary correction may be applied to the difference $\delta^i$ between its calculation and its interpolation, based on an threshold value $\varepsilon$ wherein, when the natural opacity $\omega^i$ is below $\varepsilon$, the opacity difference $\delta^i$ is set to to zero, and wherein any negative opacity difference value is also set to zero, thus:

$$\delta^i = \begin{cases} \max(\omega^i - \Omega^i, 0) & \omega^i > \varepsilon \\ 0 & \omega^i \leq \varepsilon \end{cases} \quad (6)$$

Once the opacity difference is corrected as per the conditions above, the function $f(\delta^i)$ of the opacity difference is interpolated against the white ink-step to get the first white ink prediction:

$$(7) \alpha_w^i = \Gamma^w(f(\delta^i))$$

To be consistent with notation in what follows, the first white ink prediction for the ith target color is represented by $(\alpha_w^i)^0$.

The color matching technique of the invention described above is useable in a variety of color matching processes, implementable as respective color data processing algorthims embodied in corresponding sets of instructions processed by the computer 110, for dosing inks across the 8 inks channels $116_{1-8}$ of the printer 114, and both distributable and scalable across nodes of one or more networks.

Figure 6:
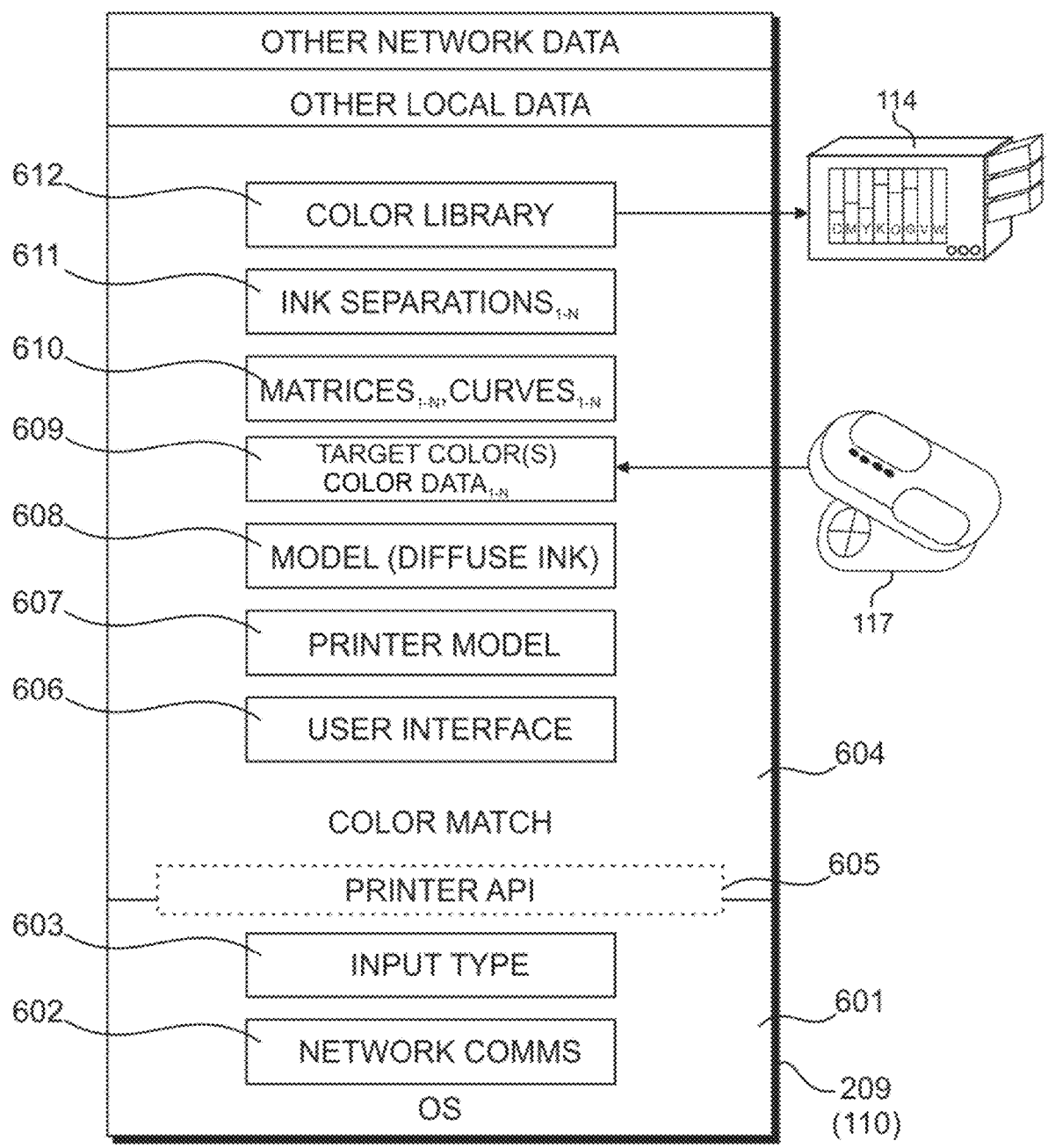
FIG. 6 is a logical diagram of the contents of the memory means of the terminal shown in FIGS. 1 and 2, including a set of instructions embodying a method as shown in FIG. 5.

Accordingly, with reference to FIG. 6 now, the contents of the memory means 209 of the computer 110 at runtime, when configured by a set of instructions embodying the color data processing techniques described herein, include an operating system is shown at 601, for instance Windows 11™ distributed by Microsoft™ Inc. of Redmond, Wash., USA. The OS 601 includes instructions for governing the basic data processing, interdependence and interoperability of the computer hardware components as described with reference to FIG. 2, and communication subroutines 602 to configure the computer 110 for bilateral network communication via the NIC 211 interfaced with the wired connection 112 to the local router 118. The OS 601 also includes input subroutines for reading and processing input data variously consisting of user direct input to human interface devices, namely the keyboard 203 and computer mouse 204.

A set of instructions is next shown at 604, which is interfaced with the printer 114 and the spectrophotometer 117 through the OS 601 via one or more Application Programmer Interfaces (API) 605. The set of instructions 604 comprises and coordinates the data processing activity of further function-specific data processing subroutines embodying the various functions and algorithms described herein, including a user interface 606 updated and output to the display 202 in real-time.

The set of instructions 604 further maintains a variety of data sets processed by its subroutines, including : one or more ICC profiles of the printer 114, shown at 607; the printer model based on diffuse ink generated at step 502, shown at 608; L*a*b data 310 for the or each target color 300 saved at step 403; shown at 609; matrix, curve and interpolation data processed at run time, shown at 610; one or more sets of ink separations $330_{1-N}$ corresponding to respective dosages of ink channels $116_{1-8}$ generated at steps 505 and 506, shown at 611; and eventually, at least one color library generated at step 411, shown at 612, usable to print the target color 300 on a reflective substrate at the printer 114.

Further local data and network data is also shown, which may be stored in the memory means 209 at runtime, and some or all of which may be processed either by the color matching application 604 and sub-routines thereof, or by or for other application(s) being processed in parallel with the color matching application 604 at runtime. Examples of further local data include spooling data for the printer 114, generated in response to a color chart-printing instruction preceding step 408; and/or L*a*b data 310 for the or each target color 300 acquired by the local spectrophotometer 117 and communicated to the terminal 110 via a USB connection to the USB module 212. Examples of network data include L*a*b data 310 for the or each target color 300 received from a remote device 130 over the WAN 120, to which the terminal 110 may respond with one or more set(s) of ink separations 330 computed according to the invention; and/or remote application or OS updating data communicated by a remote server over the WAN 120.

Figure 7:
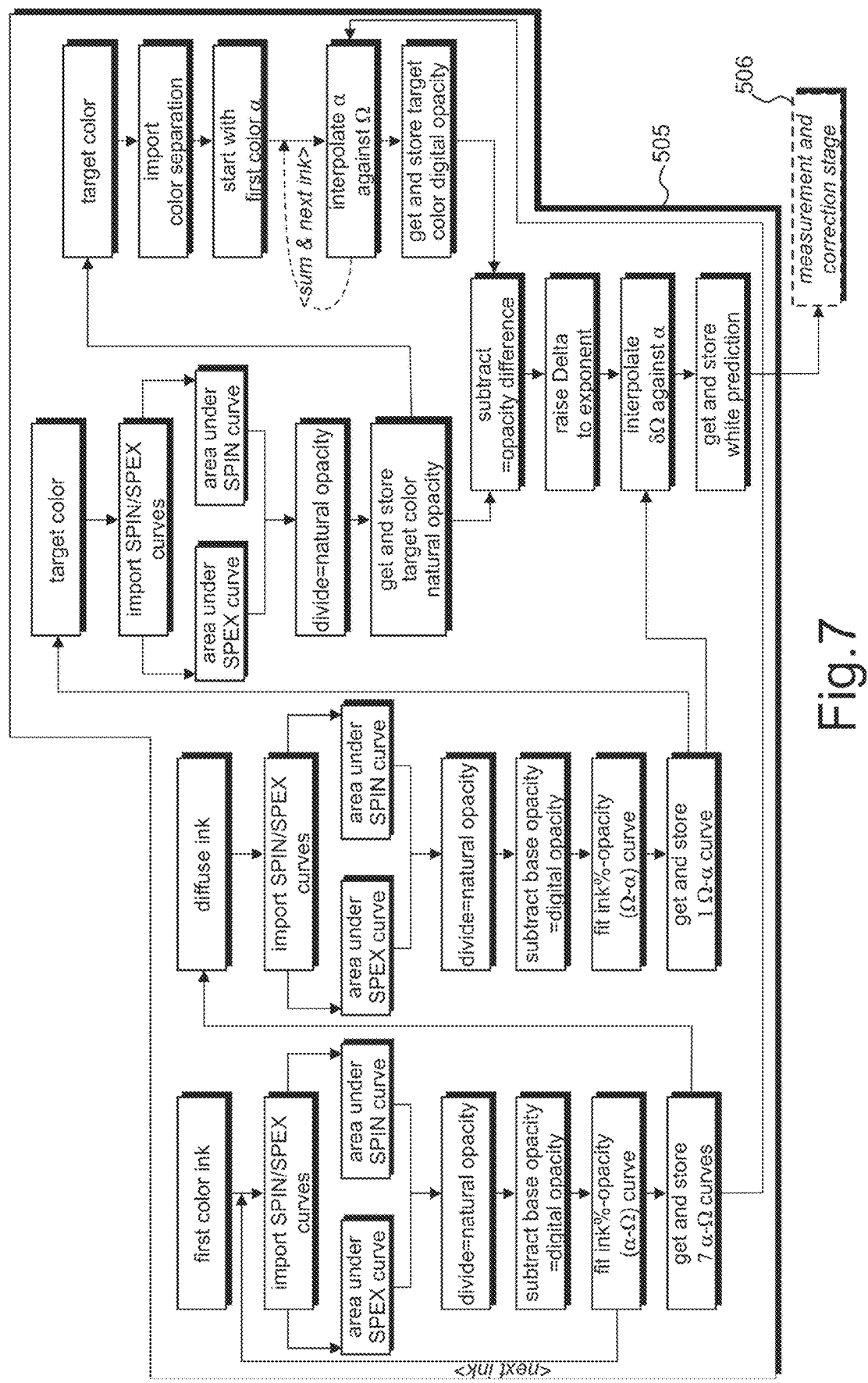
FIG. 7 is a flowchart representation of a first embodiment of the step of predicting ink separations in FIG. 5.
Figure 8:
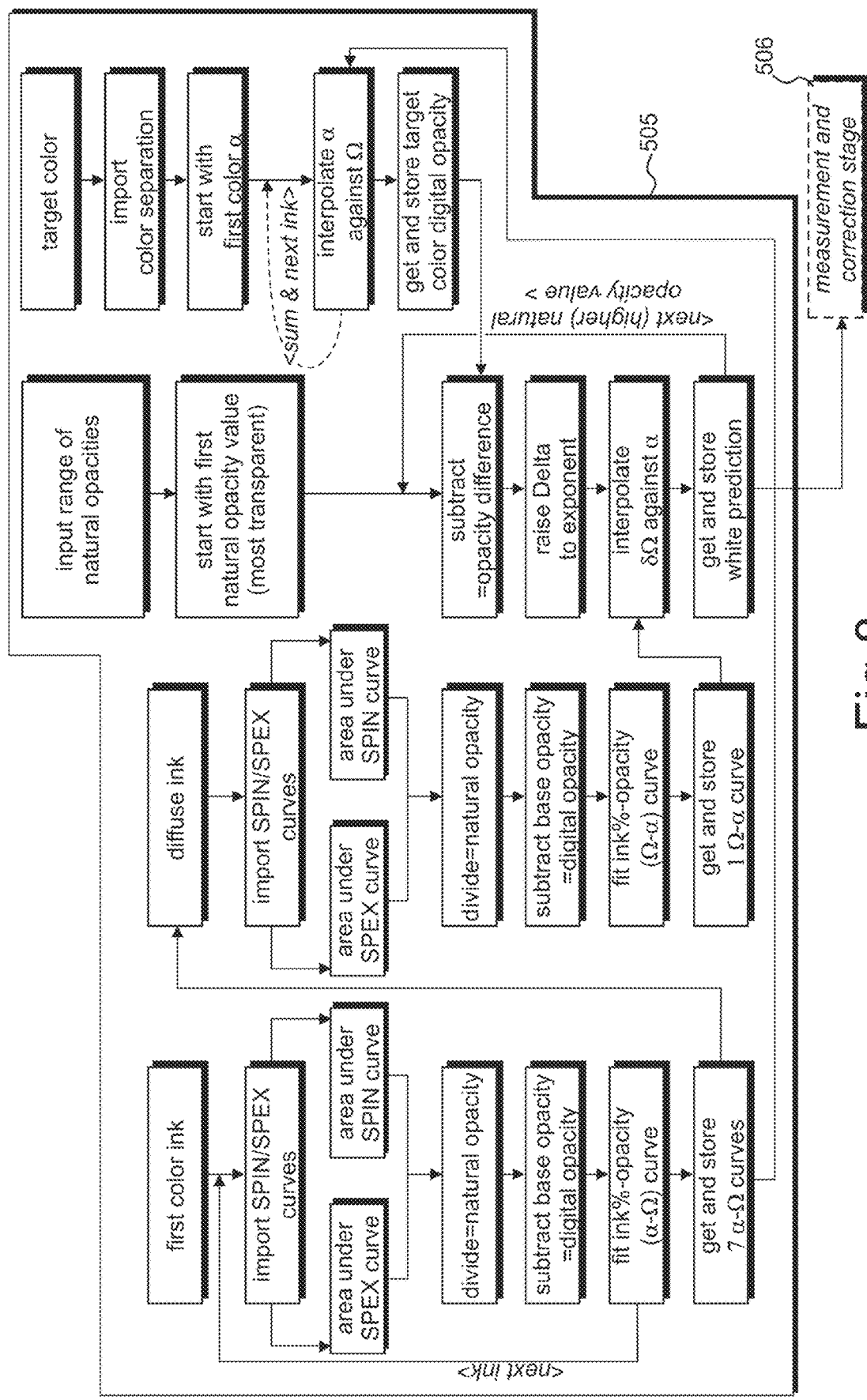
FIG. 8 is a flowchart representation of a second embodiment of the step of predicting ink separations in FIG. 5, wherein a target color is matched from transparent, to semi-opaque to opaque.

With reference to FIGS. 7 and 8 now, respective embodiments of the predicting step 505 are shown, each of which outputs ink separations including a diffuse ink component for the or each target color.

The first embodiment shown in FIG. 7 is a straightforward implementation of the inventive technique, wherein a color printed on a diffuse substrate is set as the target color, the method determines the amount of diffuse ink (e.g. white) required to match the target color when printed on a RSM substrate as previously explained, and the technique best matches the natural opacity $\omega^i$ of the target color to its digital opacity $\Omega^i$ (through the addition of a white/diffusive ink), so as to make the printed color as transparent (or opaque) as the target color whereby, once printed on a RSM substrate, the printed color will be perceived to be the same as the target color printed on a white substrate.

The second embodiment shown in FIG. 8 is referred to a transparent—semi-opaque—opaque ('TSO') color matching technique, wherein the color printed on a diffuse substrate is again set as the target color, the method again determines the amount of diffuse ink (e.g. white) required to match the target color when printed on a RSM substrate as previously explained, and the present embodiment best matches the natural opacity $\omega^i$ of the target color to its digital opacity $\Omega^i$ (through the addition of a white/diffusive ink) according to a specified range, so as to make the printed color more or less transparent (or opaque) whereby, once printed on a RSM substrate, the printed color will be perceived to be the same as the target color printed on a white substrate, or more or less transparent (or opaque).

Thus, in the second embodiment, the task is not to match the opacity of the printed color to that the target color, but to compute the amount of diffuse ink, e.g. white, required to produce different versions of the target color given a range of natural opacities. This embodiment advantageously allows a designer to assess how transparent or opaque the different versions of a target color appear, when printed on the RSM substrate.

The range of natural opacities can be classified as follow: the $n_v$ transparent versions of the target color can be represented as values in a transparency range $\{T_1, T_2\}$; the $n_{s4}$ semi-opaque versions of the target color can be represented as values in a semi-opaque range of $\{S_1, S_2\}$; the $n_v$ opaque versions of the target color can be represented as values in an opaque range $\{O_1, O_2\}$. For target colors $t_i$, TSO are represented as $n_v$ versions each of transparent, semi-opaque and opaque colors (i.e. a total of $3n_v$ versions from transparent to opaque).

The data required to predict the TSO for N number of target colors can be taken from the previous sections: $\phi_{\alpha\lambda}^\mu, \Psi_{\alpha\lambda}^\mu, \phi_{\alpha\lambda}^w, \Psi_{\alpha\lambda}^w, \alpha_\mu^i$.

The following sequence can be applied to get the TSO from a target color. The spectral $\phi_{\alpha\lambda}^\mu, \Psi_{\alpha\lambda}^\mu \rightarrow \{integrate\} \rightarrow \Phi_\alpha^\mu, \Psi_{\alpha\lambda}^\mu$
$\Phi_\alpha^\mu, \Psi_{\alpha\lambda}^\mu \rightarrow \{ratio\} \rightarrow \omega_\alpha^\mu$
$\omega_\alpha^\mu \rightarrow \{curvefit\} \rightarrow \gamma^\mu(\alpha)$
$\gamma^\mu(\alpha) \rightarrow \{removeaverage@0\%ink\} \rightarrow \Gamma^\mu(60)$
$\Gamma^\mu(\alpha) \rightarrow \{store\}$ The spectral reflectances $\phi_{\alpha\lambda}^w, \Psi_{\alpha\lambda}^w$. are next loaded, then the algorithm proceeds as:

$\phi_{\alpha\lambda}^w, \Psi_{\alpha\lambda}^w \rightarrow \{intergrate\} \rightarrow \Phi_\alpha^w, \Psi_{\alpha\lambda}^w$
$\Phi_\alpha^w, \Psi_{\alpha\lambda}^w \rightarrow \{ratio\} \rightarrow \omega_\alpha^w$
$\omega_\alpha^w \rightarrow \{removeaverge@0\%ink\} \rightarrow \Omega_\alpha^w$
$\Omega_\alpha^w \rightarrow \{invertrelationship\} \rightarrow \alpha_\Omega^w$
$\alpha_\Omega^w \rightarrow \{curvefit\} \rightarrow \Gamma^w(\Omega^w)$
$\Gamma^w(\Omega^w) \rightarrow \{store\}$ The color separation data $\alpha_\mu^i$ is then loaded to obtain the target color digital opacities from the curve-fits as previously defined in equation (5). The diffuse ink prediction will have a total of $3n_v$ number of versions of each target color ($n_v$ versions for each of the T, S and O). Therefore, the total number of diffuse-ink predictions are $N \times 3_v$. The natural opacities for the $3n_v$ versions are represented as $\omega^{i,k}$, where $k=(1,2,\ldots,3n_v)$. The difference between the natural and digital opacity for the kth version of the target color is defined as $\delta^{i,k}$. The kth diffuse ink prediction is then calculated as $\alpha_w^{i,k}$ following equations (6) and (7).

Exceptions can be applied for pastel colors, which are generally characterized by a higher natural opacity. Pastel colors can be defined as a family of pale colors with a high luminance value and low saturation. The qualifiers 'high value' and 'low saturation' are purposely relative terms. For these colors, a pastel flag $P_F^i$ is used to classify pastel colors among other colors, wherein TSO are represented as total of $n_v$ versions ranging from semi-opaque to opaque, all located in the higher natural opacity or at a threshold value which can be determined.

The qualification of a color as pastel or not is based on its spectral reflectance, can be scaled on a Pastel Index $P_{ind}$ ranging from 0 to 1 (or 0% to 100%), under a set of conditions which, in aggregate, build up the degree of confidence of that qualification as a logical output function (true/1 or false/0). The following conditions $C_n$ are provided by way of non-limitative example, and are considered apt to provide a reliable Pastel Index.

A condition $n_1$ can relate to the spectrum reflectance of the color. One condition may be to have the color spectrum close to a reference high lightness spectrum, between the susbstrate-min and substrate-max spectra as per a number of points $n_1$ in the color spectrum $\phi_\lambda^t$ that lie between the corresponding points of $\phi_\lambda^{w-min}$ and $\phi_\lambda^{w-max}$:

$$n_1 = \sum_{j=1}^{n_\lambda} \text{logical}\{\phi_\lambda^{w-max}\{j\} \geq \phi_\lambda^t\{j\} \geq \phi_\lambda^{w-min}\{j\}\}$$

This condition enforces that at least $C_1^{min}\%$ of the color spectrum should lie between $\phi_\lambda^{w-min}$ and $\phi_\lambda^{w-max}$.

Another condition $n_2$ can be the number of points in the color spectrum $\phi_\lambda^t$ that lie above the corresponding points of $\phi_\lambda^k$. This condition enforces that at least $C_2^{min}\%$ of the color spectrum should lie above the representative light black (or gray) spectrum.

Other conditions $A_{up}$ and $A_{down}$ can represent, respectively, the area between the color spectrum and the white spectrum, and the area between the color spectrum and the light black spectrum. These conditions enforce, respectively, that $A_{up}$ and $A_{down}$ should be at least $C_3^{min}$ and $C_4^{max}$ units. Furthermore, another condition can be the ratio $A_{up}:A_{down}$ should be at most $C_5^{max}$.

A further set of conditions can relate to the color space coordinates (L*a*b*, L*c*h*, L*u*v*, HSL, HSV). For example, the L* coordinate in CIE-L*a*b color space should be at least $C_6^{min}$. The $L^{hsl}$ coordinate in HSL color space should be at least $C_7^{min}$. The $V^{hsv}$ coordinate in HSV color space should be at least $C_8^{min}$. The $S^{hsv}$ coordinate in HSV colors pace should be at most $C_9^{hsv}$. The $L^{lch}$ coordinate in L*c*h* color space should be at least $C_{10}^{min}$. The $c^{lch}$ coordinate in Lch color space should be at most $C_{11}^{max}$. The $u^{luv}$ coordinate in Luv color space should be at most $C_{12}^{max}$. The $v^{luv}$ coordinate in Luv color space should be at most $C_{13}^{max}$.

Another condition can relate to the averaged RGB ratio. This condition is based on the observation that the sRGB coordinates (R, G, B) of known pastel colors are similar in magnitude. The condition enforces that the averaged ratio $\kappa$ should be at least $C_{14}^{min}$ and at most $C_{14}^{max}$, and can be defined as follows—

$$\kappa_1 = \begin{cases} R/G & \text{if } G \neq 0 \\ 50 & \text{else} \end{cases}, \kappa_2 = \begin{cases} G/B & \text{if } B \neq 0 \\ 50 & \text{else} \end{cases}, \kappa_3 = \begin{cases} B/R & \text{if } R \neq 0 \\ 50 & \text{else} \end{cases}$$

$$\kappa = \frac{\kappa_1 + \kappa_2 + \kappa_3}{3}$$

A further condition can be based on the CMYKOGV or µ color separation. This condition is based on the observation that known pastel colors have a zero (or negligibly low) black ink in the µ color separation. Let $\alpha^\kappa$ be the black ink % in the µ color separation. The condition enforces that $\alpha^\kappa$ should be at most $C_{15}^{max}$.

If the index is 1 or 100%, all conditions are matched. However, a Pastel Index threshold value can be defined by the observer. The conditions do not all have equal importance, wherein different weights $w_i$ can be assigned to each condition parity $\rho_i$, whereby the Pastel Index $\rho_{ind}$ includes all the constants used in the conditions to determine the pastel-like quality of a color, per—

$$P_{ind} = \frac{\sum_{i=1}^{cn} w_i \rho_i}{\sum_{i=1}^{cn} w_i} \quad (8)$$

Figure 9:
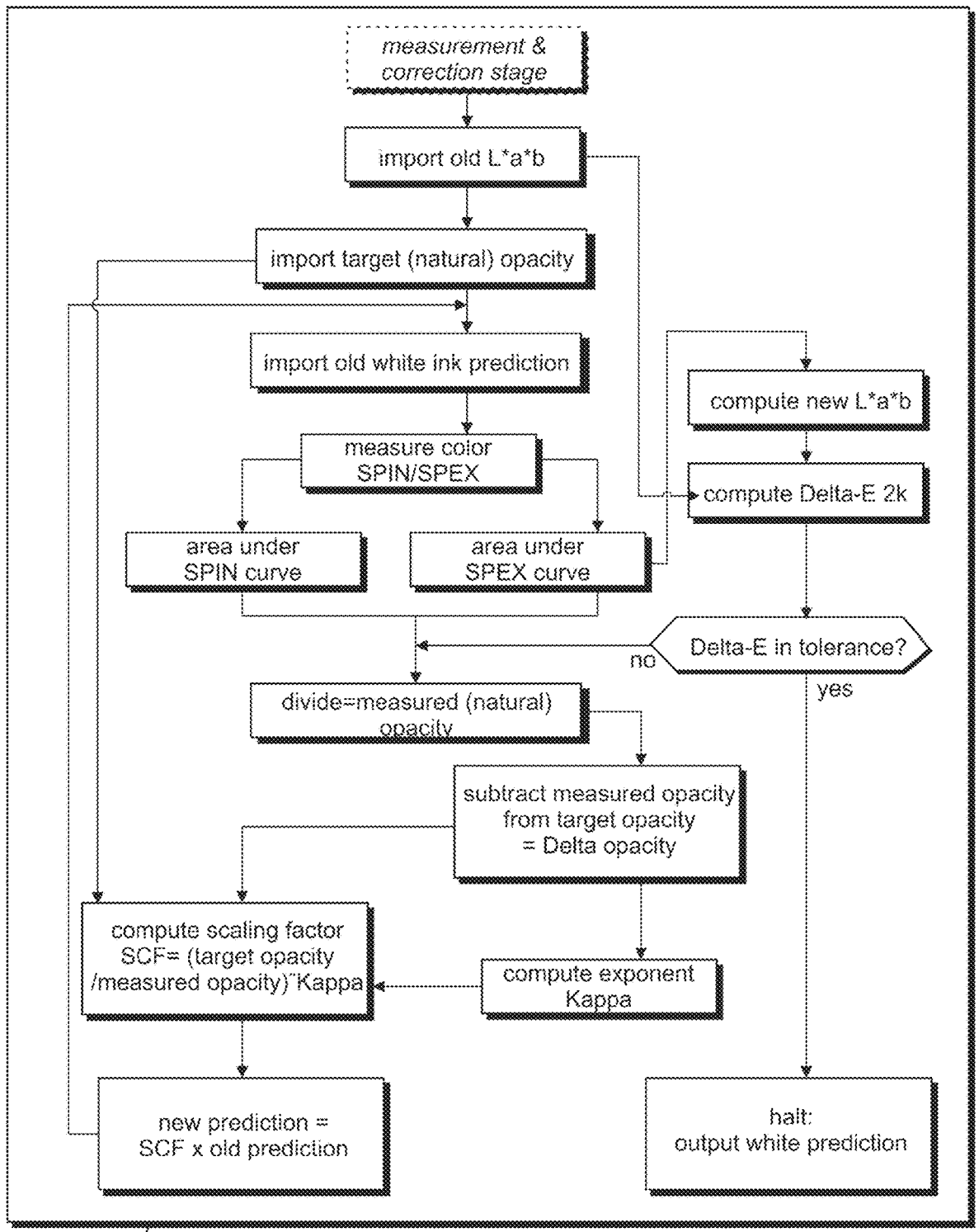
FIG. 9 is a flowchart representation of an embodiment of the step of correcting the predicted ink separations in FIG. 5, 7 and (or) 8.

With reference to FIG. 9 now, an embodiment of the correcting step 506 is shown, which outputs corrected ink separations including a diffuse ink component for the or each target color. Under this technique, the predicted diffuse ink ratios are applied for compensating the difference $\delta^i$ between the natural and digital opacities of the target colors, the spectral reflectances in SPIN and SPEX of the resulting colors are measured and color separation values are produced again, with the new SPIN and SPEX measurements providing the basis data for calculating new natural opacity values.

Thus in step 506, the or each ith target color is corrected on the basis of the procedure outlined in the preceding steps, i.e. wherein the diffuse/white ink percentage $(\alpha_w^i)^0$ necessary to compensate between the natural and the digital opacity of the target color has been calculated. The correction approach is based upon the Euclidean distance between the printed color and the target color in any given color space (CIE-XYZ, L*a*b, xyz or other), as a value indicative of how close a color, printed according to the first predicted diffuse ink component, is to the target color.

The International Commission on Illumination, commonly referred to as the CIE, has defined a color difference which takes into account the effect of perceptual non-uniformity. This is typically referred to as Delta-E, which represents the difference between the printed color and the target color in the L*a*b* color space. However, the perception of a color is also influenced by its opacity. Hence, another helpful measure to assess the color difference is the difference in the natural opacity of the target color and that of the printed color, referred to as Delta opacity ('Delta-O') in the present disclosure. The mathematical expressions for these two measures are described in detail below:

Let $\{L_1, a_1, b_1\}$ and $\{L_2, a_2, b_2\}$ be the CI E-L*a*b coordinates of two colors. The procedure for computing the color difference $\Delta E$ between the two colors is given following a known Delta-E formula such as Delta-E 2000.

Delta-E $(\Delta^i E)^j$

Let $\omega^i$ be the natural opacity of the ith target color (also called 'target opacity') per equation (4) on the calculation of natural opacities. Let $\omega^{i,j}$ be the natural opacity of the ith target color printed on a reflective substrate after the jth correction. This is also referred to as the 'measured opacity':

Delta-O $(\Delta^i O)^j$

For example, when $j=0$, $\omega^{i,0}$ is the natural opacity of the ith target color after the 0th correction, i.e. first prediction. Delta-O is then defined as:

$(\Delta^i O)^j = \omega^{i,j} - \omega^i$

Computing the corrections $(\alpha_w^i)^j$, $j>0$ to the predicted white ink $(\alpha_w^i)^0$ primarily depends upon the opacities of the measured and printed color. The performance of the correction is then assessed via both the opacity difference as well as the color difference. The proposed equation is:

$(\alpha_w^i)^{j+1} \equiv (\alpha_w^i)^{j+1}(\omega^i, \omega^{i,j}, \kappa^{i,j}, (\alpha_w^i)^j)$ wherein $\kappa$ is used to improve the equation and is defined in such a way that, when the measured opacity $\omega^{i,j}$ and the target opacity $\omega^i$ are numerically very close to each other, the ratio $$\frac{\omega^i}{\omega^{i,j}}$$

approaches unity and, therefore, the (j+1)th correction is very close to the jth correction. The proposed equation is:

$\kappa^{i,j} = \kappa^{i,j}((\Delta^i O)^j)$

The embodiment of stepp 506 in FIG. 9 accordingly optimises ink separations inclusive of the diffuse ink prediction 330 output by any of the method shown and describe with reference to FIG. 5, 7 or 8.

The skilled reader will be aware that, for analog printing systems, a target color is typically formulated using a range of color base inks. These color base inks are, in a conventional printing system, similar to what $\mu$ defines for a digital printing system. Color bases, represented as $\beta_c$, are also known as colorants or pigments wherein the subscript 'c' represents each colorant's use in a typical ink base system (for example 25 colorants). The techniques disclosed herein are useable for defining the opacity of 8, wherein $\mu$ may be simply replaced by $\beta_c$ in the present description, which can advantageously enhance conventional ink formulation systems. The opacity prediction algorithms described herein can provide the user with the opacity information in conjunction with the color to choose its best match recipe. For example, step 401A can be used to characterize $\beta_c$ and 401B can be used to characterize the conventional diffuse inks. The natural opacities of $\beta_c$ can be curve fit as per equation (1), the resulting digital opacity curve as per equation (2), and diffuse ink digital opacity as per equation (3). Equations (4) and (5) can be used to assess further corrections or selection of different recipe based on a measured Delta-E and Delta-O differences.

Figure 10:
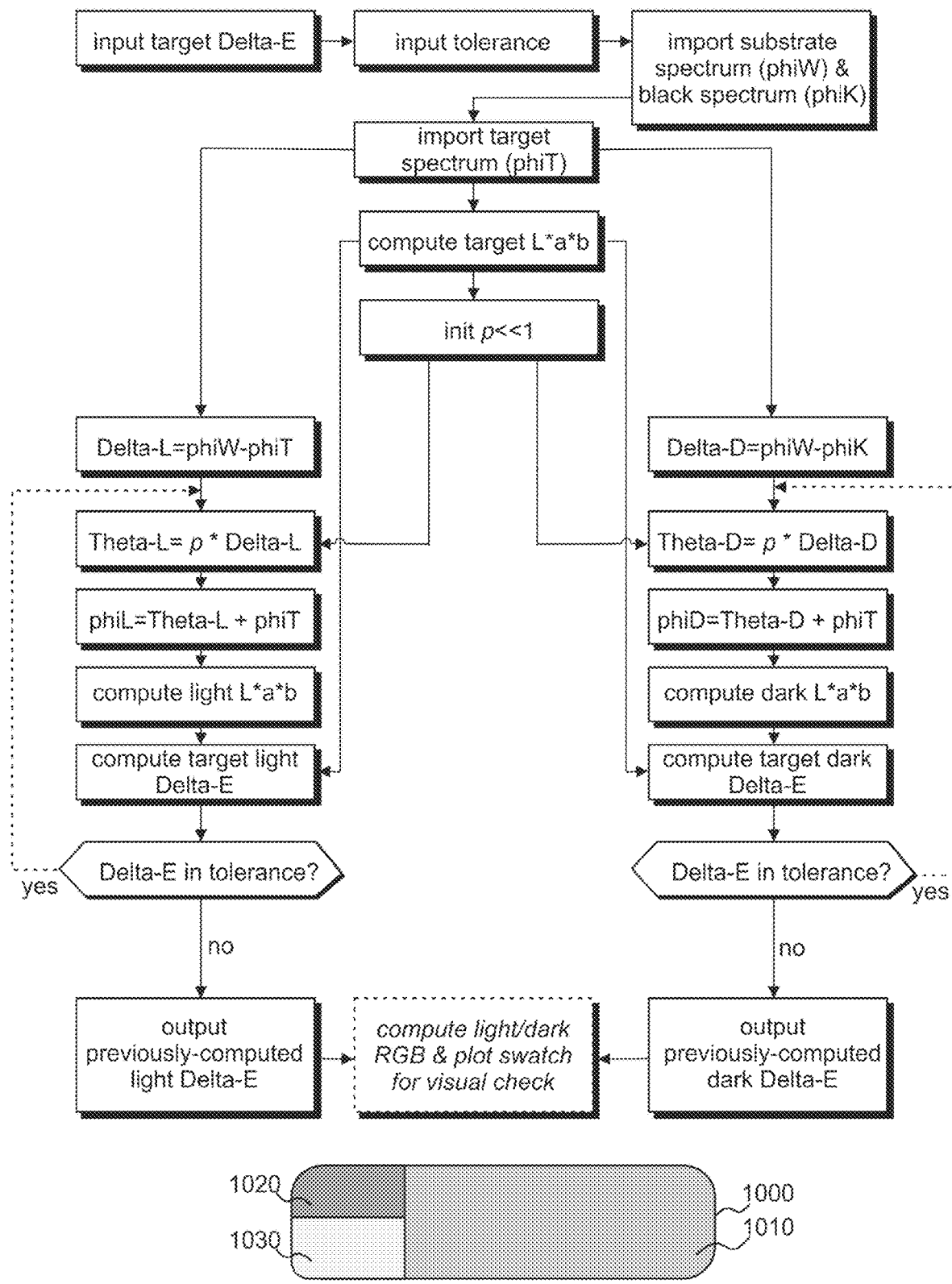
FIG. 10 is a flowchart representation of a method of automatically computing a lighter and a darker version of the target color inks separation output by the methods described herein.

With reference to FIG. 10 now, an operator running a conventional printing press may require a physical representation 1000 of the target color, which defines the production tolerances of the printing assignment. The target color is typically a sample of the ink formula, also known as ink drawdown 1010, applied directly onto the printed substrate 1000. The target ink drawdown 1010 is frequently accompanied by darker 1020 and lighter 1030 versions, which correspond respectively to thinner and heavier weights of ink film of the target color, applied with the same ink formula onto the same substrate 1000. In this context, the embodiment of the color matching method shown in FIG. 10 automatically computes, from the best match output at step 506, lighter and darker representations of a target color at a specific distance $\Delta E$ in the L*a*b color space.

The L*a*b values of a target color and the substrate are known, along with the spectral reflectance, ideally with the black spectral reflectance printed onto the same substrate on which the target color is measured. Upon inputting a tolerance threshold for the lighter and the darker versions, for example a preset $\Delta E$ value and including potentially different values for each of the lighter and the darker versions, the lighter color (of a higher luminance in coordinate L) is typically characterized by a spectral curve that lies above (at a positive offset from) the spectral curve of the target color. The darker color (with a lower luminance in coordinate L) typically lies below (at a negative offset from) the target color spectral reflectance curve.

To obtain a lighter color 1030, the spectral reflectance curve of the target color can be raised in positive incremental steps, and the resulting $\Delta E$ monitored via spectrum $\rightarrow$XYZ, XYZ$\rightarrow$L*a*b, then finally computing $\Delta E = Lab_{target} - Lab_{light}$. The processing loop can be terminated when the difference between the target (desired) $\Delta E$ and the theoretical $\Delta E$ is within the specified tolerance. The ink separation of the computed lighter color is most likely to be different from the target color. Therefore, the opacity of the lighter color usually requires a correction following equations (6) and (7). A darker color 1020 may be obtained by following the same methodology, but applying negative offset increments instead.

However, raising or lowering the spectral reflectance curve by a constant offset across the curve can result in a perceptually-different color, which deviates significantly not only in the L coordinate, but also in the a and b coordinates.

To remedy this, the offset itself can be made a function of the wavelength. A strategy is suggested, wherein the offset varies along the spectrum based on the distance of the spectral curve from the corresponding substrate and eventually the black spectral reflectance.

The theoretical L*a*b values of a target color are expectedly different from those of the target color printed on a substrate, due to varying printing conditions such as inks, printing speed, room humidity and temperature, tolerances of measuring device, etc. Most importantly, in digital printing technologies, in order to print a color using a μ-ink process, the target L*a*b coordinates are converted to the corresponding μ-ink color separation based on a given printer model as previously described, or another printer calibration profile, wherein the color separation itself is non-unique. Therefore, the theoretical target color and the printed target color expectedly have a non-zero ΔE therebetween.

This ΔE automatically carries over to the corresponding lighter and darker versions of the theoretical target color. Hence the ΔE obtained between the printed target and the printed lighter version is usually not exactly the same as the desired ΔE. The compensation for this deviation requires an iterative corrective procedure, provided with the present embodiment.

To obtain the target Spectrum to Target Lab: $\phi_\lambda^T \rightarrow$ Lab ($\mathcal{T}^{th}$), the CIE-XYZ tristimulus coordinates of the theoretical target color $\mathcal{T}^{th}$ are computed using the spectral reflectances $R(\lambda) = \phi_\lambda^T$. For example, the D50 illuminant is used for the illuminant spectral power distribution $S(\lambda)$. The CIE-1931 standard observer is used for the observer color matching functions $\bar{x}_i(\lambda), \bar{y}_i(\lambda), \bar{z}_i(\lambda)$, with a conversion to the CIE-L*a*b coordinates from the XYZ tristimulus values. Let the L*a*b coordinates of the theoretical target color $\mathcal{T}^{th}$ be denoted as Lab($\mathcal{T}^{th}$). Thus, the operations of this section can be written as:

$$[\text{Lab}(\mathcal{T}^{th})] = \text{SpectrumToLab}\{\phi_\lambda^T\}$$

The lighter darker color spectral reflectance can be denoted respectively as:

$$\phi_\lambda^T, \phi_\lambda^w, \phi_\lambda^k, \rho \rightarrow \phi_\lambda^L, \phi_\lambda^D$$

Let $\phi_\lambda^T$, $\phi_\lambda^w$ and $\phi_\lambda^k$ be the spectral reflectances of the target, white and black color respectively. The differences in the spectral curves are defined as:

$$\delta_\lambda^{Tw} \in \mathbb{R}^+ = \phi_\lambda^w - \phi_\lambda^T$$

$$\delta_\lambda^{Tk} \in \mathbb{R}^+ = \phi_\lambda^T - \phi_\lambda^k$$

Let ρ be the percent increment (0 to 1) in $\phi_\lambda^T$ to raise or lower the spectral curve. The offset functions $\theta_\lambda^{Tw}$, $\theta_\lambda^{Tk}$ are then defined as $$\theta_\lambda^{Tw} \in \mathbb{R}^+ = +\rho \cdot \delta_\lambda^{Tw}$$

$$\theta_\lambda^{Tk} \in \mathbb{R}^- = -\rho \cdot \delta_\lambda^{Tk}$$

The spectral reflectances of the lighter/darker color spectra $\phi_\lambda^L$, $\phi_\lambda^D$ are obtained by adding the corresponding offsets to the target spectrum:

$$\phi_\lambda^L = \phi_\lambda^T + \theta_\lambda^{Tw}$$

$$\phi_\lambda^D = \phi_\lambda^T + \theta_\lambda^{Tk}$$

Conversion from spectrum to L*a*b uses the same procedure and utility functions detailed above. The representation of the Lighter/Darker Spectrum to Lighter/Darker is:

$$\text{Lab: } \phi_\lambda^L \rightarrow \text{Lab}(\mathcal{L}^{th}), \phi_\lambda^D \rightarrow \text{Lab}(\mathcal{D}^{th})$$

The library function Delta-E 2000 is used to compute the color difference between the target and the light/dark shades. The Target Vs. Light/Dark Color Difference are denoted as:

$$\Delta E(\mathcal{T}^{th}, \mathcal{L}^{th}), \Delta E(\mathcal{T}^{th}, \mathcal{D}^{th})$$

Confirmation that the color difference obtained by raising or lowering the target spectral curve is equal to the desired color difference, within the specified tolerance ε:

$$\Delta E(\mathcal{T}^{th}, \mathcal{L}^{th}) \overset{\epsilon}{=} \Delta E_{TL}$$

$$\Delta E(\mathcal{T}^{th}, \mathcal{D}^{th}) \overset{\epsilon}{=} \Delta E_{TD}$$

Lab($\mathcal{L}^{th}$), Lab($\mathcal{D}^{th}$) is stored, then a converting function such as lab2rgb is used to get the RGB coordinates of the light/dark versions for plotting the color swatches for visual overview on a monitor display. The solution is eventually printed with the system 100, inclusive of the darker and lighter colors 1020, 1030 with the target color 1010, for evaluation of the color match.

The viewing condition is an important component for a good evaluation of a color matching and opacity matching of a printed target color. The light source has a strong incidence on angular light scattering of colors printed on reflective substrates, whether flat or cylindrical. Remaining under the same lighting conditions, but rotating the color, provides the impression of a color change when visualized from different viewing angles. In this context, normalized light and observation systems have been developed and adopted by professionals, which provide substantially standardized viewing conditions.

Figure 11:
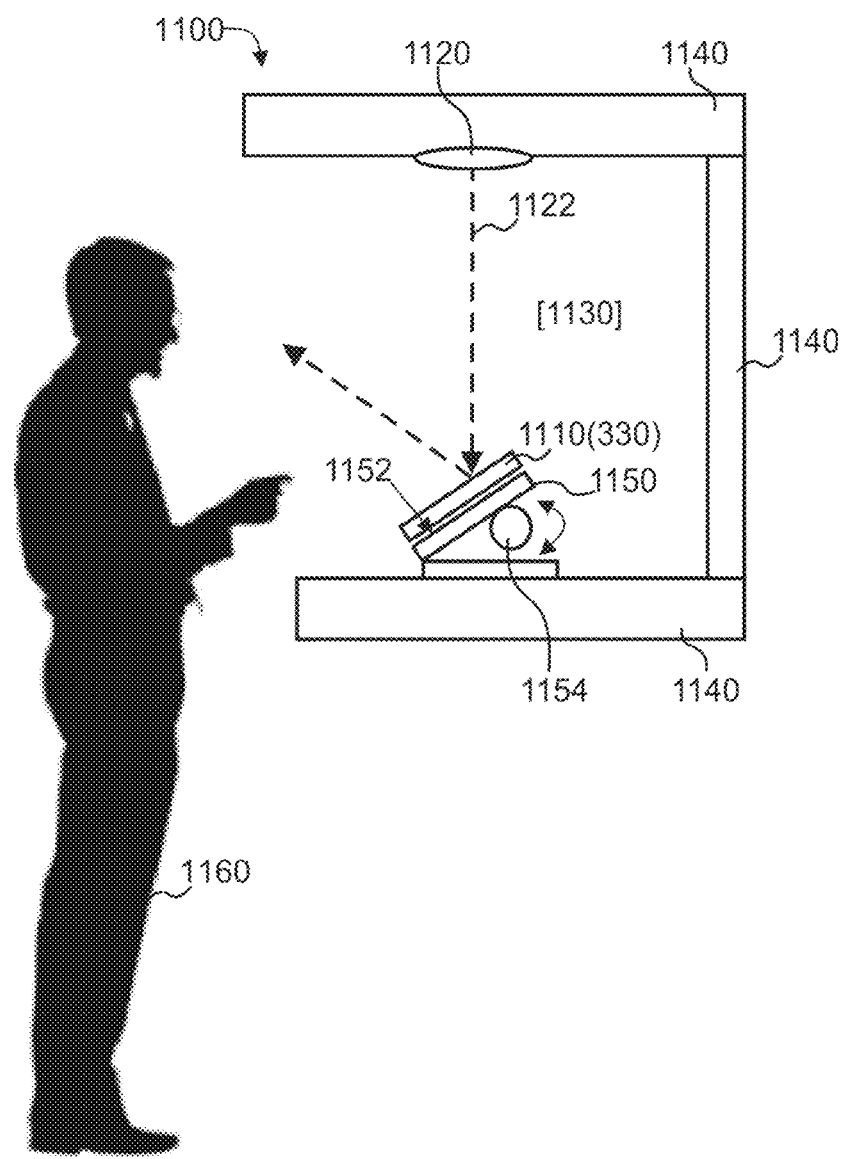
FIG. 11 illustrates a viewing booth at which a user may perform a visual check of one or more target color(s) printed according the methods described herein.

FIG. 11 illustrates an example of a color observation station 1100 for observing a printed color or color-printed object (flat, cylindrical or a shape) 1110 under normalized direct or indirect light 1120 within a light booth 1130. The light booth is typically composed of shielding walls 1140 to prevent light contamination of the normalized light 1120 with other adjacent light sources such as office lamps, windows and the like.

A color or object placeholder 1150 locatable within the light booth underneath the normalized light 1120 is configured with a support plane 1152 having a top face facing the light source 1120, wherein the support plane is rotatable with a manual or automated crank member 1154 for facilitating observation of the color under different viewing angles, specular or non-specular.

The observation station 1100 is preferably configured to correlate the opacity of a color matched according to the invention (e.g $\omega^i$ or, $\Omega^i$) with the viewing angle θ under normalized light conditions (e.g. D50 or D65), wherein θ is the positive angle of the placeholder support plane 1152 measured from the light booth axial plane which is, ideally, perpendicular to the light direction 1122 of the light source 1120. Repeated observation tests have shown that the range of opacities values between transparent and opaque are typically between 15 and 90 respectively. Hence, the same values are preferably used to define the range of θ, wherein the range starts at substantially $\theta_{min}$ as for example 15° for a viewing condition suited to transparent colors evaluated in specular viewing conditions, contrarily to opaque colors observable in a diffuse light condition of $\theta_{max}$ of substantially 90° for example, 0° providing similar viewing conditions to 90°.

As the observer 1160 is located at a distance from the placeholder, the color to evaluate is visually assessed on the top face at its transparency-respective viewing angle, wherein the support plane 1152 can then be rotated to evaluate each successive color of the sample.

The range of opacities for a color can be classified according to the output of the transparent-semiopaque-opaque embodiments, simplifying the color assessment procedure within the range. For example, transparent colors can have an opacity range from $\{T_1, T_2\}$, semi-opaque from $\{S_1, S_2\}$ and opaque colors from $\{O_1, O_2\}$ which belong to the $\theta_{min}$-$\theta_{max}$ range.

The present invention thus provides computer-implemented methods for dosing ink in a digital multichannel printer in a single workflow when printing on a reflective substrate, embodiments of which further provide for easily correcting and adjusting values representative of the initially computed diffuse ink dosage.

The present disclosure advantageously simplifies and accelerates the color matching process for professional users, with a first set of ink separations 330 inclusive of a diffusive effect, that is demonstrably much closer a match for the target color 300, relative to techniques of the prior art. The benefits of these techniques extend to optical checking by the professional user: the color chart printed with the first set of ink separations 330 computed according to the invention, and/or with a subsequent set of ink separations corrected according to the invention, can be printed on an optical clear or transparent layer substrate, which the user can superimpose onto a printable blank of the reflective substrate, for assessment, for instance in the viewing booth 1100.

It has been observed that superimposing a transparent layer (plastic of a certain thickness) affects the angular light scattering from the incident light. Therefore, the transparent layer can be considered to be part of the diffusing elements to a greater or lesser degree based on the total amount of ink deposited in the printing process. Additionally, the ink deposited on the transparent layer can be applied front or reverse to the substrate enabling a differential gloss effect typical from the transparent layer.

Network-distributed embodiments of the computer-implemented method disclosed herein are contemplated, wherein the predictive aspect of the method is augmented by machine-learning algorithm(s) taught to detect changes in the printing system and to compensate the predicted ink separation 330 according to the detected changes.

Such machine-learning techniques can be developed from a corpus of data collected over time, that is representative of color and opacity deviation in printing systems. Such data can be based on variables, such as varitations in the ink or the substrate from one production batch to another, variations in the calibration of a spectrophotometer, the wear of digital printing system parts such as the printing head and more, which are all known to affect the consistency of a final printed color between batches over time In a specific example that is particularly relevant to the field of RSM substrate printing, the use of achromatic inks in a printing system frequently introduces larger and heavier particles, relative to pigment particles of other chromatic inks: white ink uses titanium dioxide particles which are difficult to maintain in suspension in the ink formula vehicle, eventually causing ink density loss and/or print heads to clog, wherein suuch achromatic inks require permanent or semi-permanent agitation.

The use of machine-learning techniques with the present method is expected to continuously optimize the predictions, as printing systems are regularly re-linearized and/or re-calibrated, yet the corresponding data is used only at the time of performing the action, so capturing, aggregating and auditing this data for patterns should continuously improve the prediction models for the color and opacity matching process, for example by using the gradient descent algorithm which is a first-order iterative optimization for finding a local minimum of a differentiable function.

In the specification the terms "comprise, comprises, comprised and comprising" or any variation thereof and the terms include, includes, included and including" or any variation thereof are considered to be totally interchangeable and they should all be afforded the widest possible interpretation and vice versa.

The invention is not limited to the embodiments hereinbefore described but may be varied in both construction and detail.

The invention claimed is:

1. A computer-implemented method for dosing ink in a printing device with multiple ink channels when printing on a reflective substrate, comprising the steps of—
    capturing target color data of at least one target color to be printed on the reflective substrate, wherein the target color data comprises both color data and spectral reflectance data inclusive of specular component included and specular component excluded;
    generating a printer model;
    processing the captured color data with the printer model to output a preliminary dosing ratio for each ink channel, representative of a respective color component of the target color;
    computing a curve from each ratio and interpolating same to output a digital opacity value for the respective ink channel;
    combining respective digital opacity values of all ink channels to output a digital opacity value for the at least one target color;
    computing a natural opacity value from the captured spectral reflectance data;
    calculating a difference between the computed digital opacity value and the computed natural opacity value; and
    interpolating the calculated difference against an ink step of a diffuse ink component of the at least one target color to output a predicted dosing ratio for each ink channel.

2. The method according to claim 1, comprising the further step of calibrating the printer with both specular component and specular on a diffuse ink layer applied to the substrate.

3. The method according to claim 2, wherein the step of generating the printer model further comprises generating the printer model based on specular component and specular component on the diffuse ink layer applied to the substrate.

4. The method according to claim 3, comprising the further step of defining a target opacity value, by subtracting a value representative of the specular component excluded of the target color data from a value representative of the specular component included of the target color data.

5. The method according to claim 4, comprising the further steps of—
    classifying the or each target color according to the defined target opacity; and
    repeating the step of processing with substituting the captured color data for data representative of the or each classified color;
    wherein the output predicted dosing ratio for each ink channel includes a dosing ratio for the diffuse ink.

6. The method according to claim 5, comprising the further steps of
adding the predicted ratio of diffuse ink to the natural opacity value for outputting a next natural opacity value; and
calculating a difference between the natural opacity value and the next natural opacity value;
wherein the calculated difference is a value referred to as delta opacity for the reflective substrate.

7. The method according claim 6, comprising the further step of correcting the predicted dosing ratio for each ink channel with a composite function saved as a look-up table.

8. The method according to claim 1, comprising the further step of correcting the calculated difference before the step of interpolation, wherein the step of correcting comprises setting the calculated difference to zero, either when the natural opacity value is below a predefined threshold value, or when the calculated difference value is negative.

9. The method according to claim 1, wherein the target color is formulated by a conventional ink formulation system having a characterized colorant, a set of base inks, and conventional diffuse inks, the method comprising the further step of specifying an opacity level at each ink step.

10. The method according to claim 1, comprising the further step of inputting a range of natural opacity values, wherein each output predicted dosing ratio includes a diffuse ink percentage corresponding to a target color with a digital opacity selected from the range transparent to opaque including semi-opaque.

11. The method according to claim 10, comprising the further steps of
defining a set of conditions based on color characteristics associated with pastel colors
filtering the captured target color data with the defined set of conditions and
classifying the target color data as a pastel color according to the filtering.

12. The method according to claim 1, comprising the further steps of
setting at least one tolerance threshold, representative of a distance in a L*a*b color space from coordinates of the target color therein; and
computing the predicted dosing ratio for each ink channel respectively for a lighter version and a darker version of the target color according to the tolerance threshold.

13. The method according to claim 1, comprising the further steps of—
generating a color chart from the predicted dosing ratio for each ink channel; or
generating a color chart from the corrected dosing ratio for each ink channel; and
printing the color chart with the printer on a test substrate.

14. The method according to claim 13, wherein the test substrate is transparent.

15. The method according to claim 13, comprising the further steps of
configuring a color observation station with a normalized light source and a support plane having a variable viewing angle;
locating a printed substrate on the support plane; and
orienting the viewing angle of the support plane according to the computed opacity level of the target color.

16. The method according to claim 15, wherein the computed opacity level of the target color is in the range 15°, representative of a substantially transparent target color, to 90°, representative of a substantially opaque target color.

17. A set of instructions recorded on a data carrying medium or stored at a network storage medium which, when read and processed by a data processing terminal, configures that terminal to perform the steps of the method according to claim 1.

18. A digital printing system comprising a printing device with multiple ink channels, means for capturing target color data of at least one target color to be printed on a reflective substrate with the printing device, and a data processing terminal internal to, or operably interfaced with, the printing device, configured by a set of instructions to—
receive the captured target color data, wherein same comprises both color data and spectral reflectance data inclusive of specular component included and specular component excluded;
generate a printer model;
process the captured color data with the printer model to output a preliminary dosing ratio for each ink channel, representative of a respective color component of the target color;
compute a curve from each ratio and interpolating same to output a digital opacity value for the respective ink channel;
combine respective digital opacity values of all ink channels to output a digital opacity value for the at least one target color;
compute a natural opacity value from the captured spectral reflectance data;
calculate a difference between the computed digital opacity value and the computed natural opacity value; and
interpolate the calculated difference against an ink step of a diffusive ink component of the at least one target color to output a predicted dosing ratio for each ink channel.

19. The system according to claim 18, wherein the means for capturing is a spherical or multi-angle spectrophotometer.

20. The system according to claim 18, wherein the system further comprises a network to which the data processing terminal and a remote terminal are operably interfaced, and wherein the captured target color data is received from the remote terminal.

21. The system according to claim 20, further comprising bridging means interfacing the data processing terminal and/or the spectrophotometer with remote storage means; and optionally
wherein the data processing terminal is further configured to encrypt captured color data prior to uploading same to the remote storage means.

22. The system according to claim 21, wherein the remote storage means is a data processing node configured to process stored color data and output a predicted dosing ratio for each ink channel according to a color data request of the remote data processing terminal or another.

23. The system according to claim 18, wherein the reflective substrate is selected from the group comprising reflective, shiny and/or mirrored ('RSM') substrates, including metal such as aluminum, plastic such as film, foil and vinyl, and glass.

* * * * *